(12) United States Patent
Zhang et al.

(10) Patent No.: US 11,622,381 B2
(45) Date of Patent: Apr. 4, 2023

(54) CONTROL INFORMATION UPDATE FOR DYNAMIC TIME-DIVISION DUPLEXING (TDD)

(71) Applicant: QUALCOMM Incorporated, San Diego, CA (US)

(72) Inventors: Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 15/885,966

(22) Filed: Feb. 1, 2018

(65) Prior Publication Data

US 2018/0324856 A1    Nov. 8, 2018

Related U.S. Application Data

(60) Provisional application No. 62/500,859, filed on May 3, 2017.

(51) Int. Cl.
| | |
|---|---|
| *H04W 74/08* | (2009.01) |
| *H04W 72/23* | (2023.01) |
| *H04W 72/0453* | (2023.01) |

(52) U.S. Cl.
CPC ....... *H04W 74/0808* (2013.01); *H04W 72/23* (2023.01); *H04W 74/0866* (2013.01); *H04W 72/0453* (2013.01)

(58) Field of Classification Search
CPC ......... H04W 74/0808; H04W 72/1289; H04W 74/0866; H04W 72/0453; H04W 72/14;

(Continued)

(56) References Cited

U.S. PATENT DOCUMENTS

| | | | |
|---|---|---|---|
| 2010/0182968 A1* | 7/2010 | Ojala | H04W 72/042 370/329 |
| 2015/0334685 A1* | 11/2015 | Ji | H04W 72/1247 370/330 |

(Continued)

FOREIGN PATENT DOCUMENTS

WO    WO-2016185275 A1 *    11/2016 ............ H04W 72/10

OTHER PUBLICATIONS

ZTE, ZTE Microelectronics, R1-1701616 (Discussion on duplexing flexibility and cross-link interference mitigation schemes), Feb. 13-17, 2017, 3GPP TSG RAN WG1 Meeting #88, Athens, Greece, whole document (Year: 2017).*

(Continued)

*Primary Examiner* — Benjamin H Elliott, IV
*Assistant Examiner* — Jose L Perez
(74) *Attorney, Agent, or Firm* — Haynes and Boone, LLP

(57) ABSTRACT

Wireless communications systems and methods related to updating control information based on medium sensing are provided. A first wireless communication device communicates with a second wireless communication device, a first transmission grant for a transmission opportunity (TXOP) in a frequency band. The first wireless communication device performs medium sensing for the TXOP. The performing the medium sensing includes detecting a reservation signal for the TXOP. The first wireless communication device transmits, to the second wireless communication device, an updated transmission grant for the TXOP based on at least the first transmission grant and the medium sensing. The first wireless communication device transmits, to the second wireless communication device in the frequency band, data during the TXOP based on the updated transmission grant.

26 Claims, 14 Drawing Sheets

(58) Field of Classification Search
CPC ............. H04W 72/1294; H04W 72/12; H04W 74/0816; H04W 74/0825
See application file for complete search history.

(56) References Cited

U.S. PATENT DOCUMENTS

| | | | | |
|---|---|---|---|---|
| 2016/0100408 | A1* | 4/2016 | Hedayat | H04L 65/80 370/329 |
| 2016/0330764 | A1* | 11/2016 | Kim | H04W 74/0816 |
| 2017/0019909 | A1* | 1/2017 | Si | H04W 76/28 |
| 2017/0150525 | A1* | 5/2017 | Atefi | H04W 52/0229 |
| 2017/0208625 | A1* | 7/2017 | Choi | H04W 74/006 |
| 2017/0230939 | A1* | 8/2017 | Rudolf | H04W 88/02 |
| 2017/0265214 | A1* | 9/2017 | Hessler | H04B 7/0456 |
| 2017/0311327 | A1* | 10/2017 | Tanaka | H04W 72/0453 |
| 2017/0347268 | A1* | 11/2017 | Chen | H04B 1/7143 |
| 2018/0007712 | A1* | 1/2018 | Lou | H04W 74/006 |
| 2018/0027590 | A1* | 1/2018 | Yerramalli | H04W 16/14 370/328 |
| 2018/0049224 | A1* | 2/2018 | Dinan | H04W 4/70 |
| 2018/0132248 | A1* | 5/2018 | Yang | H04L 1/1812 |
| 2018/0132254 | A1* | 5/2018 | Chae | H04W 76/14 |
| 2018/0132278 | A1* | 5/2018 | Oteri | H04W 74/0808 |
| 2018/0199300 | A1* | 7/2018 | Bergstrom | H04W 56/00 |
| 2018/0270834 | A1* | 9/2018 | Falconetti | H04W 72/082 |
| 2018/0278454 | A1* | 9/2018 | Islam | H04L 1/0038 |
| 2018/0352571 | A1* | 12/2018 | Wang | H04W 72/14 |
| 2019/0110310 | A1* | 4/2019 | Obregon | H04W 74/02 |
| 2019/0268939 | A1* | 8/2019 | Yang | H04W 72/042 |
| 2019/0274054 | A1* | 9/2019 | Salem | H04W 74/0808 |
| 2020/0067577 | A1* | 2/2020 | Lou | H04B 7/04 |
| 2020/0245376 | A1* | 7/2020 | Cao | H04W 72/042 |

OTHER PUBLICATIONS

CATT, R1-1702113 (Interference management for dynamic TDD and flexible duplex), Feb. 13-17, 2017, 3GPP TSG RAN WG1 Meeting #88, Athens, Greece, whole document (Year: 2017).*
InterDigital Communications, R1-1702382 (Bandwidth adaptation in NR), Jan. 13-17, 2017, 3GPP TSG RAN WG1 Meeting #88, Spokane, USA, whole document (Year: 2017).*
Charfi et al., IEEE 802.11ac TXOP sharing technique: Performance evaluation, Jan. 20-22, 2016, 2016 12th Annual Conference on Wireless On-demand Network Systems and Services (WONS), whole document (Year: 2016).*
Arora et al., Adaptive TXOP Allocation Based on Channel Conditions and Traffic Requirements in IEEE 802.11e Networks, Mar. 2010, IEEE Transactions on Vehicular Technology, vol. 59, No. 3, pp. 1087-1099 (Year: 2010).*
MediaTek Inc., R1-1702719 (Interference management in NR), Feb. 13-17, 2017, 3GPP TSG RAN WG1 Meeting #88, Athens, Greece, whole documen (Year: 2017).*
ZTE, ZTE Microelectronics, R1-1701613 (Overview of Duplexing and Cross-link Interference Mitigation), Feb. 13-17, 2017, 3GPP TSG RAN WG1 Meeting #88, Athens, Greece, whole document (Year: 2017).*
Huawei, HiSilicon, R1-1701661 (Dynamic resource allocation of different numerologies), Feb. 13-17, 2017, 3GPP TSG RAN WG1 Meeting #88, Athens, Greece, whole document (Year: 2017).*
MediaTek Inc., R1-1702719 (Interference management in NR), Feb. 13-17, 2017, 3GPP TSG RAN WG1 Meeting #88, Athens, Greece, whole document (Year: 2017).*

* cited by examiner

CONTROL INFORMATION UPDATE FOR DYNAMIC TIME-DIVISION DUPLEXING (TDD)

CROSS REFERENCE TO RELATED APPLICATIONS

The present application claims priority to and the benefit of the U.S. Provisional Patent Application No. 62/500,859, filed May 3, 2017, which is hereby incorporated by reference in its entirety as if fully set forth below and for all applicable purposes.

TECHNICAL FIELD

This application relates to wireless communication systems, and more particularly to improving spectrum sharing by updating control information for dynamic time-division duplexing (TDD).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. In some instances, multiple network operating entities may share their licensed spectrum with each other or with other third-party operators to better utilize the spectrum. One approach to sharing a medium or a spectrum is to employ a priority-based coordinated access scheme. In the priority-based coordinated access scheme, a shared spectrum is partitioned into multiple time periods. At any time period, one operator may be a primary user and have priority to access the spectrum while other operators may opportunistically access to the spectrum when the spectrum is available.

In addition to prioritizing spectrum access for different network operating entities, the scheme can prioritize spectrum access for different link directions within a network operating entity. While the scheme allows for dynamic TDD, where a link priority can be changed from a default link direction, a target receiver of a low priority link has no knowledge of whether a transmitter of the low priority link may proceed with a transmission as scheduled or yield access to the high priority link.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a first transmission grant for a transmission opportunity (TXOP) in a frequency band; performing, by the first wireless communication device, medium sensing for the TXOP; and transmitting, by the first wireless communication device to the second wireless communication device, an updated transmission grant for the TXOP based on at least the first transmission grant and the medium sensing.

In an additional aspect of the disclosure, a method of wireless communication includes communicating, by a first wireless communication device with a second wireless communication device, a first transmission grant for a transmission opportunity (TXOP) in a frequency band; and receiving, by the first wireless communication device from the second wireless communication device, an updated transmission grant for the TXOP based on a medium sensing for the TXOP.

In an additional aspect of the disclosure, an apparatus include a transceiver configured to communicate with a second wireless communication device, a first transmission grant for a transmission opportunity (TXOP) in a frequency band; and transmit, to the second wireless communication device, an updated transmission grant for the TXOP based on at least the first transmission grant and a medium sensing; and a processor configured to perform the medium sensing for the TXOP.

In an additional aspect of the disclosure, an apparatus includes a transceiver configured to communicate with a second wireless communication device, a first transmission grant for a transmission opportunity (TXOP) in a frequency band; and receive, from the second wireless communication device, an updated transmission grant for the TXOP based on a medium sensing for the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
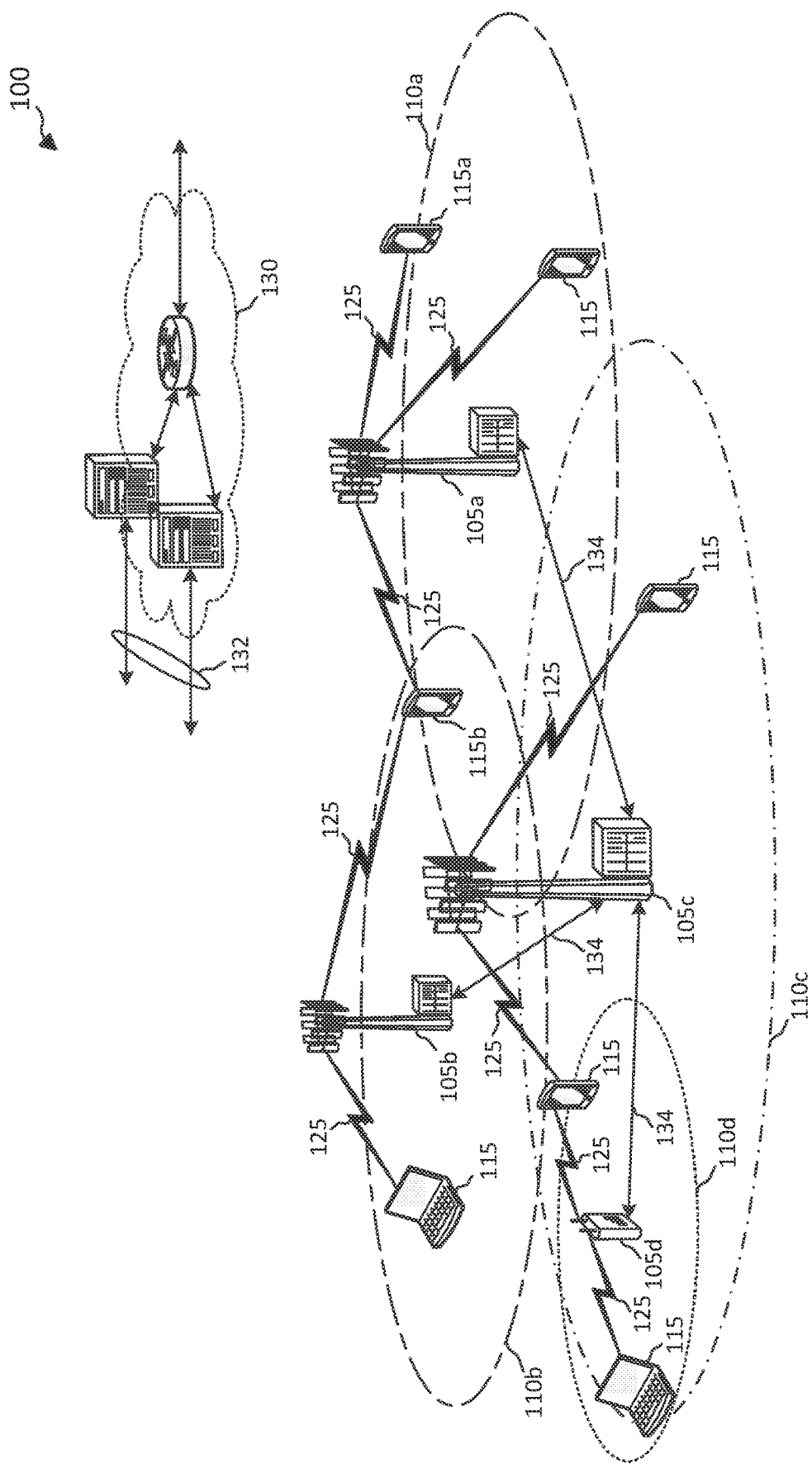
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for updating control information in dynamic TDD. In a priority-based medium sharing scheme, one link direction may have priority over another link direction for accessing a transmission opportunity (TXOP) in a medium. For dynamic TDD, a DL-granting BS may transmit a DL schedule to a UE for a DL communication in the TXOP, while a UL-granting BS transmits a UL schedule to another UE for a UL communication in the TXOP. The target receiver of the high-priority link may transmit a reservation signal to indicate a reservation for the TXOP and to silence nodes of the low-priority link. The target transmitter of the low-priority link may monitor the medium for a reservation signal from the high-priority link. For a DL communication, the granting BS is a target transmitter and the scheduled UE is a target receiver. Conversely, for a UL communication, the scheduled UE is a target transmitter and the granting BS is a target receiver. In an embodiment, the low-priority target transmitter may update or modify the schedule, such as a modulation order, a code rate, a transmit power, a transmission rank, and/or a subband allocation, based on the monitoring. The low-priority target transmitter may transmit the updated schedule to the target receiver. Subsequently, the low-priority target transmitter may proceed to transmit data to the target receiver based on the updated schedule.

In one embodiment, the target transmitter may transmit the updated schedule via cross-carrier scheduling. In one embodiment, the target transmitter may transmit the updated schedule in a designated time period within the TXOP. In one embodiment, the target transmitter may transmit the updated schedule in a transmission period of the TXOP along with the data. For example, the target transmitter can configure the transmissions of the updated schedule and the data to have similar transmission property according to the medium sensing. When the low-priority link is DL, the updated schedule may be determined and transmitted by a corresponding DL-granting BS. In an embodiment when the low-priority link is UL, the updated schedule may be determined and transmitted by a corresponding scheduled UE.

Aspects of the present disclosure can provide several benefits. For example, the modifying of the initial schedule based on medium monitoring or sensing enable a target transmitter of a low-priority link to utilize at least some portions of resources in the medium instead of refraining from accessing the medium and abandoning the scheduled communication. Thus, the present disclosure can improve spectrum utilization efficiency while controlling interference between UL and DL. In addition, the additional signaling of the updated schedule enable the target receiver of a low-priority link to receive data according to the updated schedule instead of blind decoding, which may be complex and less accurate. Further, the disclosed embodiments allow a UE scheduled for a UL communication to modify a UL schedule and feedback the updated schedule to the granting BS. Thus, allowing control information update for both DL and UL directions in dynamic TDD.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination. Further, UL and DL access to the spectrum within a particular network operating entity can be prioritized and interference between UL and DL can be controlled and managed, as described in greater detailer herein.

Figure 2:
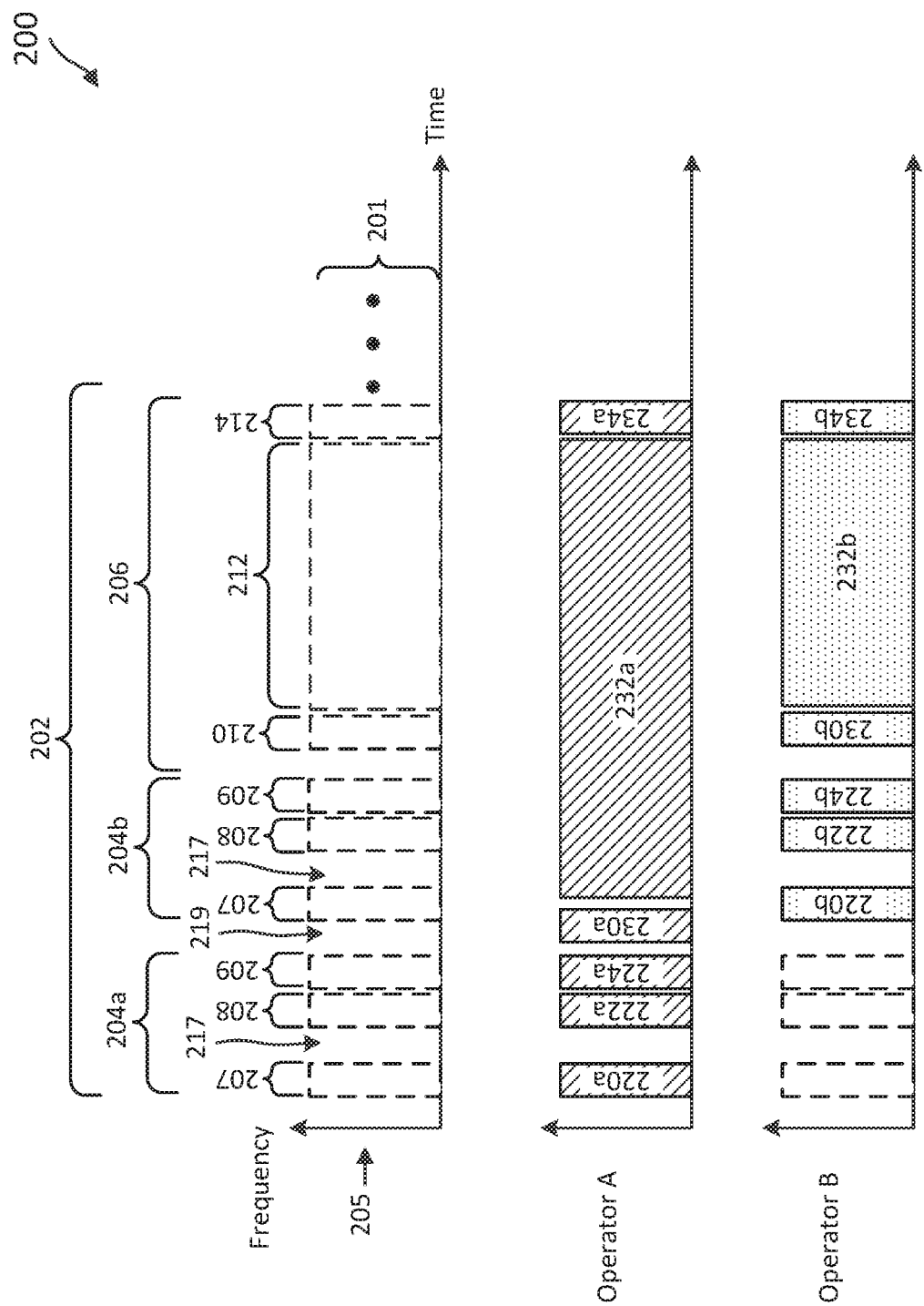
FIG. 2 illustrates a coordinated priority-based medium sharing scheme with interference management according to embodiments of the present disclosure.

FIG. 2 illustrates a coordinated priority-based spectrum sharing scheme 200 with interference management according to embodiments of the present disclosure. The x-axes represent time in some constant units. The y-axes represent frequency in some constant units. The scheme 200 may be employed by the BSs 105 and the UEs 115 to access a shared frequency band 201. While the scheme 200 illustrates coordinated spectrum access for two different network operating entities (e.g., Operator A and Operator B), the scheme 200 can be applied to any suitable number of network operating entities, including three, four, or more operating entities.

In the scheme 200, the frequency band 201 is time-partitioned into a plurality of transmit opportunities (TXOPs) 202 as shown in the frame structure 205. The TXOPs 202 may have a fixed duration and may be defined in units of OFDM symbols, subframes, slots, and/or any suitable time format. In some embodiments, the TXOP 202 may have a duration of about 10 milliseconds (ms) to about 40 ms. Each TXOP 202 includes a plurality of channel sensing or clear channel assessment (CCA) periods 204 followed by a transmission period 206. The CCA periods 204 are separated by a gap period 219. The frame structure 205 of the TXOP 202 can be predetermined and known by all network operating entities sharing the frequency band 201. The network operating entities may be time-synchronized when operating in the shared frequency band 201.

Each CCA period 204 can be assigned to a particular network operating entity (e.g., Operator A or Operator B). The assigned network operating entity may transmit a reservation in the CCA period 204 to reserve the following transmission period 206. Each CCA period 204 includes portions 207, 208, and 209. The portions 207 and 208 are separated by a gap period 217. The portions 207 are used for transmitting reservation request (RRQ) signals 220. Each RRQ signal 220 may include a predetermined preamble sequence, a request-to-send (RTS) signal, and/or transmission triggers (e.g., scheduling information). The portions 208 are used for transmitting reservation response (RRS) signals 222 for operator-level sharing (e.g., across operators). The portions 209 are used for transmitting RRS signals 224 for link-level sharing (e.g., between UL and DL) within an operator. Each of the RRS signals 222 and 224 may include a predetermined preamble sequence or a clear-to-send (CTS) signal. The CCA periods 204 can be arranged in a decreasing order of priorities. Thus, a low-priority operator node can monitor the channel (e.g., the shared frequency band 201) in the CCA periods 204 of higher priorities. Upon detection of a reservation from a high-priority operator node, the low-priority operator node may refrain from transmitting in the following transmission period 206. The gap period 219 allows low-priority operator nodes to process the reservation of a higher priority operator. The gap period 217 allows for switching between UL and DL processing.

The transmission period 206 can include a DL control portion 210, a data portion 212, and a UL control portion 214. The DL control portion 210 is used for transmitting DL controls 230 (e.g., UL or DL triggers) for the data portion 212 and/or the UL control portion 214. The data portion 212 is used for transmitting UL or DL data 232 based on a corresponding DL control 230. The UL control portion 214 is used for transmitting UL controls 234 (e.g., scheduling request (SR) and hybrid automatic repeat request (HARQ) information).

As an example, Operator A has priority over Operator B in the particular TXOP 202. As such, the high-priority CCA period 204a is assigned to Operator A and the low-priority CCA period 204b is assigned to Operator B. The pattern-filled boxes shown with respect to the primary user and the secondary user in FIG. 2 represent signal transmissions. The dashed-outline boxes at the top of FIG. 2 are included as references to the TXOP structure 205 without signal transmission.

For operator-level sharing, a BS of Operator A may transmit an RRQ signal 220a in the portion 207 of the CCA period 204a to reserve the following transmission period 206. The RRQ signal 220a may include a trigger for a UE. A target receiver corresponding to the trigger may transmit an RRS signal 222a in the portion 208 of the CCA period 204a to silence lower-priority operators (e.g., Operator B). When the trigger is a DL trigger, the UE is the target receiver. Conversely, when the trigger is a UL trigger, the BS is the target receiver. Subsequently, the Operator A BS may communicate a DL control 230a, data 232a, and a UL control 234a with the triggered UE in the following transmission period 206.

Operator B (e.g., the low-priority operator) may monitor the CCA period 204a for an RRQ signal 220a and/or an RRS signal 222a from Operator A (e.g., the high-priority operator). Upon detection of an RRQ signal 220a and/or an RRS signal 222a from the high-priority Operator A, Operator B nodes may yield spectrum access to Operator A. However, when the shared frequency band 201 is not reserved by Operator A, Operator B may opportunistically access the transmission period 206 of the TXOP 202 using similar mechanisms as Operator A. For example, a BS of Operator B may transmit RRQ signal 220b in the portion 207 of the assigned CCA period 204b to trigger a UE for a communication in the transmission period 206. A target receiver identified in the trigger may transmit an RRS signal 222b in the portion 208 of the CCA period 204b when there are lower priority operator nodes. When the trigger is a DL trigger, the target receiver is the UE. When the trigger is a UL trigger, the target receiver is the BS. Subsequently, the Operator B BS may communicate a DL control 230b, data 232b, and/or a UL control 234b with the triggered UE in the transmission period 206.

For link-level sharing within Operator A or Operator B, Operator A or Operator B may use substantially similar reservation mechanisms as in the operator-level sharing. For example, DL may have priority over UL in the TXOP 202. A target receiver of the high-priority link direction may transmit an RRS signal 224 in the portion 209 of a corresponding CCA period 204 to silence nodes of the low-priority link direction. In addition, dynamic TDD may be applied to the switch the prioritized link direction in the TXOP 202, for example, from DL to UL. Further, the transmission period 206 may be further divided into sub-periods and dynamic TDD may be applied per sub-period. Mechanisms for performing dynamic TDD are described in greater detail herein.

Figure 3:
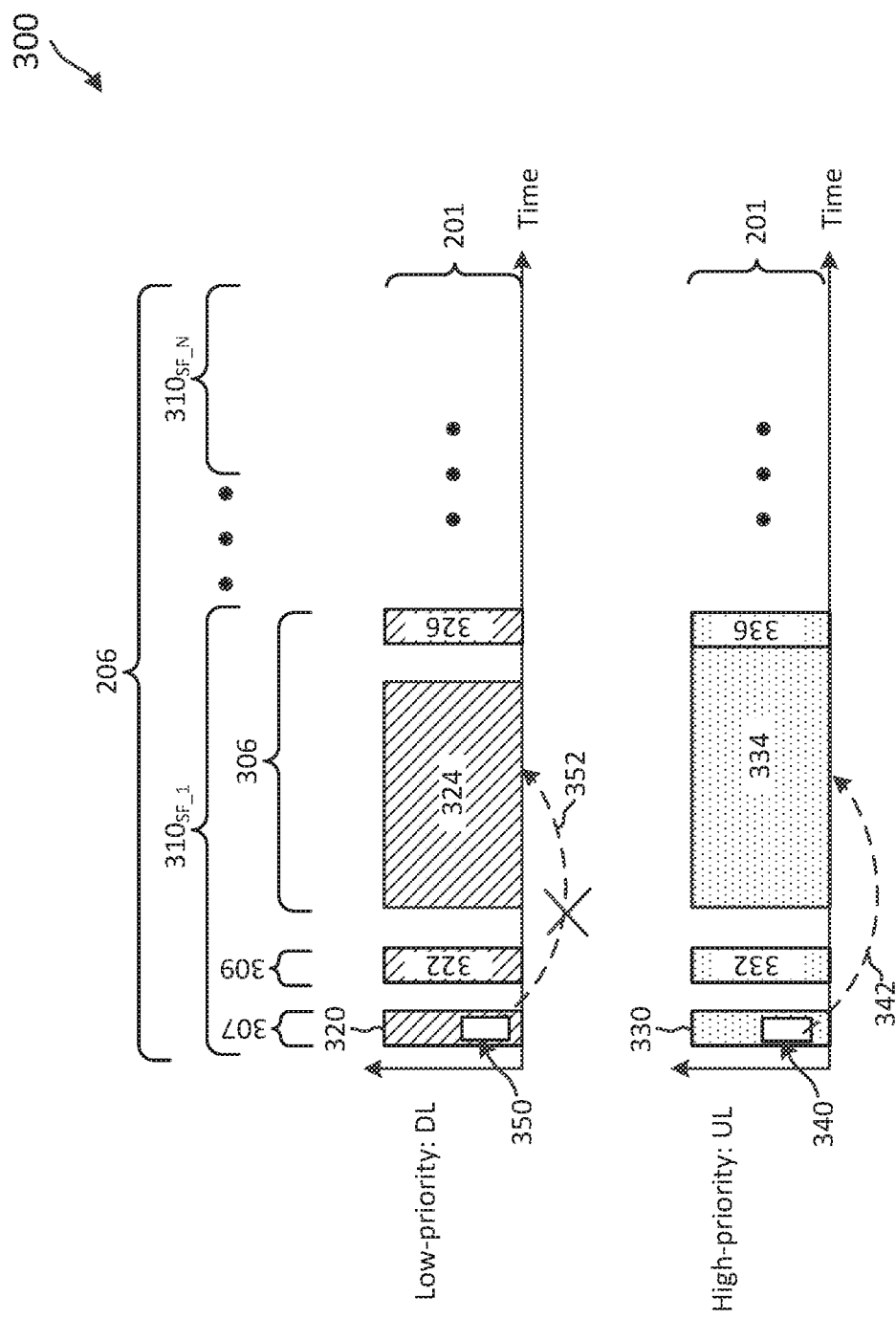
FIG. 3 illustrates a dynamic time-division duplexing (TDD) scenario according to embodiments of the present disclosure.
Figure 4:
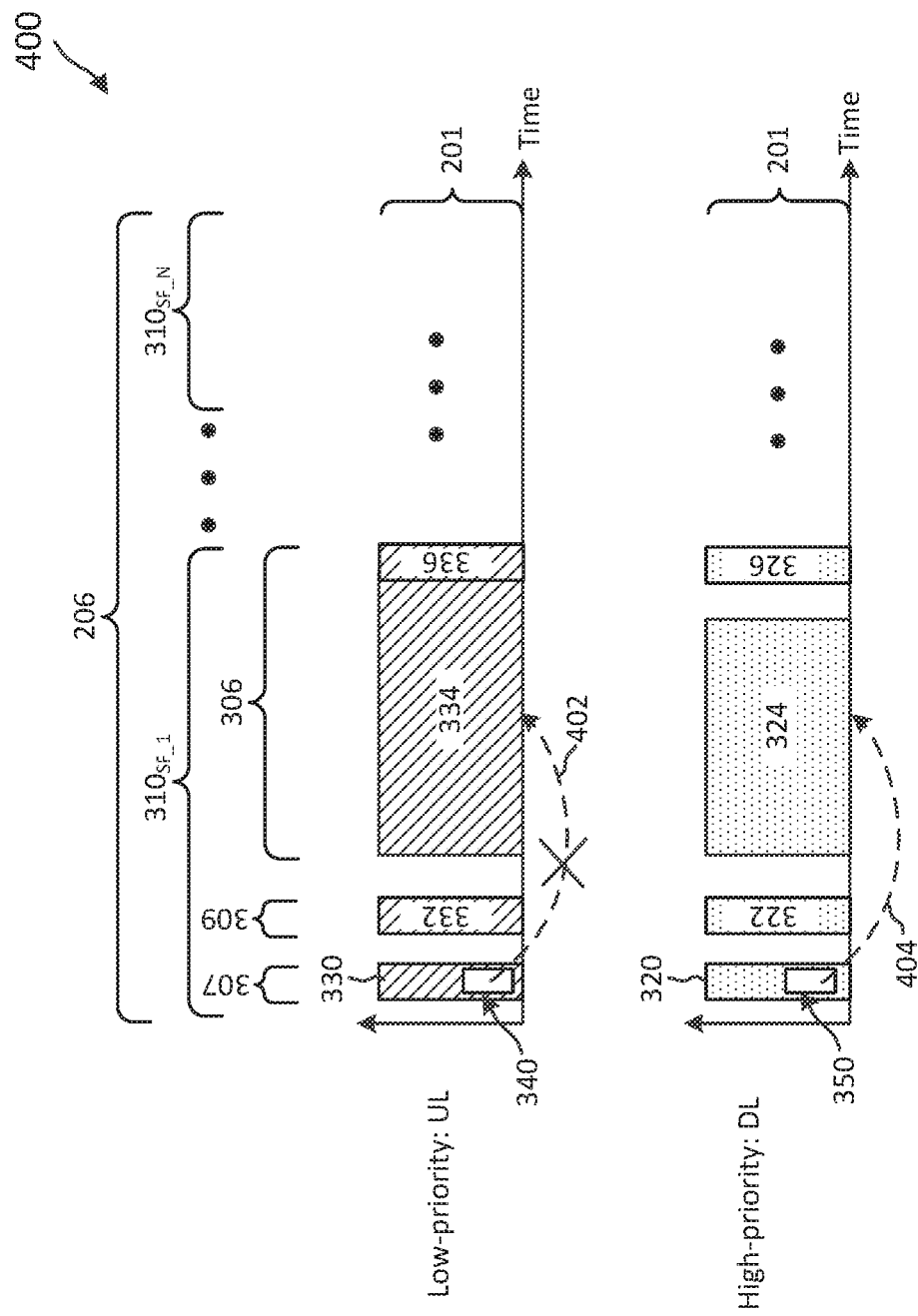
FIG. 4 illustrates a dynamic TDD scenario according to embodiments of the present disclosure.

FIGS. 3 and 4 illustrates further interference control in dynamic TDD based on the link-level sharing mechanisms in the scheme 200 described above with respect to FIG. 2. In FIGS. 3 and 4, the x-axes represent time in some constant units and the y-axes represent frequency in some constant units.

FIG. 3 illustrates a dynamic TDD scenario 300 according to embodiments of the present disclosure. In the scenario 300, the transmission period 206 is time-partitioned into a plurality of sub-periods 310 shown as $310_{SF\_1}$ to $310_{SF\_N}$. Each sub-period 310 can be a self-contained subframe. For example, a BS 105 may communicate with a UE 115 in each sub-period 310. In some instances, each sub-period 310 may have a duration between about 500 microseconds (µs) to about 1 ms. Each sub-period 310 can be assigned with a default link direction for data communication. Dynamic TDD may be applied to dynamically change a link priority in each sub-period 310 using similar link-level sharing mechanisms as in the scheme 200.

As an example, in the sub-period $310_{SF\_1}$, the high-priority link is UL and the low-priority link is DL. A UL-granting BS transmits an RRQ signal 330 (e.g., the RRQ signal 220) during a portion 307 (e.g., the portion 207) of the sub-period $310_{SF\_1}$. In some instances, the RRQ signal 330 may be similar to an LTE physical downlink control channel (PDCCH) signal. An LTE PDCCH signal may carry one or more transmission grants for one or more UEs. The transmission grants may be formatted according to LTE downlink control indicator (DCI) formats, which indicate resource blocks (e.g., frequency resources), MCS, and/or other transmission configuration parameters assigned to corresponding transmission grants. The RRQ signal 330 includes a UL transmission grant 340 for the UL-scheduled UE in a following portion 306 of the sub-period $310_{SF\_1}$. The UL transmission grant 340 may include scheduling information such as a modulation coding scheme (MCS), a subband allocation, a transmission rank, and/or pre-coding parameters. The UL-granting BS (e.g., the target receiver) transmits an RRS signal 332 (e.g., the RRS signals 224) during a portion 309 (e.g., the portion 209) of the sub-period $310_{SF1}$ to silence nodes of the low-priority link (e.g., DL). Subsequently, the UL-scheduled UE transmits UL data 334 (e.g., the data 232) and a UL control 336 (e.g., the UL controls 234) to the UL-granting BS during a portion 306 of the sub-period $310_{SF1}$. The UL data 334 and the UL control 336 are transmitted according to the UL transmission grant 340 as shown by the dashed arrow 342.

For dynamic TDD, a DL-granting BS transmits an RRQ signal 320 during the same portion 307 based on reuse one. The RRQ signal 320 may be similar to the RRQ signals 220 and 330. The RRQ signal 320 indicates a DL transmission grant 350 for the DL-scheduled UE in the portion 306. The DL transmission grant 350 may include scheduling information similar to the UL transmission grant 340. The DL-scheduled UE (e.g., the target receiver) may transmit an RRS signal 322 (e.g., the RRS signals 224) during the portion 309 to silence low-priority operator nodes. In some embodiments, the RRS signals 322 and 332 may be transmitted in different subbands of the frequency band 201.

The DL-granting BS (e.g., the low-priority link) may monitor for an RRS signal 332 from the high-priority link (e.g., the UL) to determine whether the link direction can be switched. When no RRS signal 332 is detected, the DL-granting BS may proceed to transmit DL data 324 to the DL-scheduled UE and the DL-scheduled UE may transmit a UL control 326 according to the DL transmission grant 350. However, upon detection of an RRS signal 332 from the high-priority link, the DL-granting BS may yield spectrum access to the high-priority link.

In some embodiments, the DL-granting BS may determine that the receive signal strength of the RRS signal 332 is sufficiently low, indicating that the high-priority receiver may be substantially far away from the DL-granting BS. Thus, the DL-granting BS may determine that a transmission from the DL-granting BS may not have a significant interference impact on the high-priority UL communication and proceed with the scheduled DL transmission.

Alternatively, the DL-granting BS may determine the receive signal strength of the RRS signal 332 may be relatively strong, indicating that the high-priority receiver may be relatively close to the DL-granting BS. To improve spectrum utilization efficiency, the DL-granting BS may modify the DL schedule instead of completely yielding access to the high-priority UL communication. For example, the DL-granting BS may reduce the transmit power and/or modify other transmission parameters based on the detection to minimize interference impact on the UL communication (e.g., the UL data 334 and the UL control 336) and continue with the transmission of the DL data 324. Thus, the transmission of DL data 324 may not match the initial DL transmission grant 350 as shown by the dashed arrow 352 with the cross. However, the DL-scheduled UE has no knowledge of the yielding and/or the DL schedule change, and thus may rely on blind detection to detect and decode the DL data 324.

FIG. 4 illustrates a dynamic TDD scenario 400 according to embodiments of the present disclosure. The scenario 400 is substantially similar to the scenario 300. However, in the scenario 400, the high-priority link in the sub-period $310_{SF\_1}$ is DL instead of UL as in the scenario 300. In the scenario 400, a DL-granting BS and a UL-granting BS may schedule a DL communication and a UL communication, respectively, using similar mechanisms as in the scheme 200 and the scenario 300. The communication (e.g., the DL data 324 and the UL control 326) over the high-priority link (e.g., DL) may proceed according to the initial DL transmission grant 350 as shown by the dashed arrow 404. Similar to the scenario 300, the communication (e.g., the UL data 334 and the UL control 336) over the low-priority link (e.g., UL) may proceed without yielding, but the scheduling or transmission parameters may be modified such that the interference impact on the high-priority DL communication may be minimized Thus, the transmission of UL data 334 may not match the initial UL transmission grant 340 as shown by the dashed arrow 402 with the cross. The UL-granting BS may have no knowledge of the scheduling adjustment, and thus may rely on blind detection to detect and decode the UL data 334.

While the low-priority receivers in the scenarios 300 or 400 may apply blind detection for the data reception or detection, blind detection may be complex and may not be accurate in some instances. To facilitate the schedule adjustment, the target transmitter may signal the updated schedule prior to the transmission, as described in greater detail herein.

Figure 5:
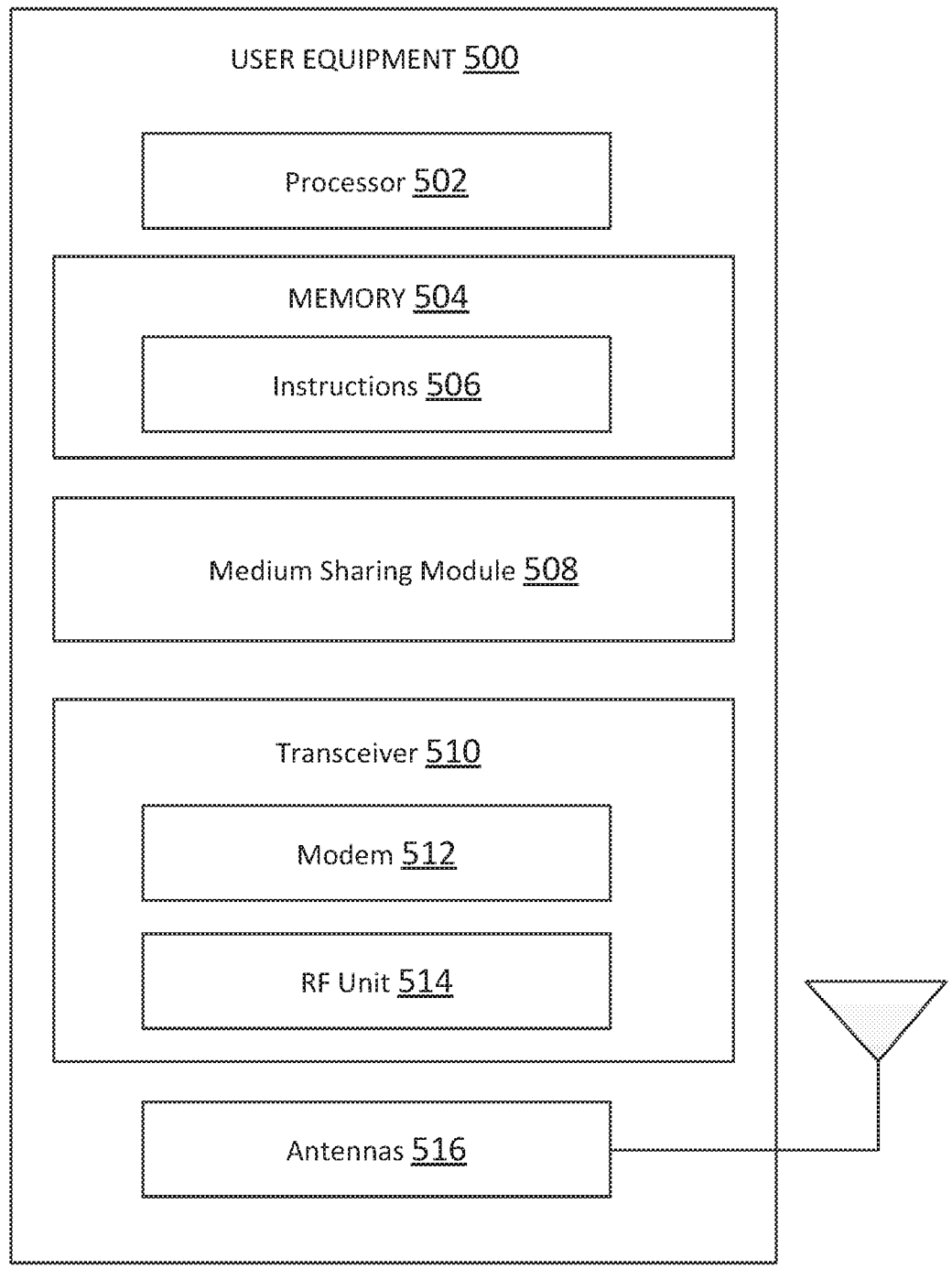
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115 as discussed above. As shown, the UE 500 may include a processor 502, a memory 504, a medium sharing module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 215 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The medium sharing module 508 may be implemented via hardware, software, or combinations thereof. For example, the medium sharing module 508 may be implemented as a processor, circuit, and/or instructions 506 stored in the memory 504 and executed by the processor 502. The medium sharing module 508 may be used for various aspects of the present disclosure. For example, the medium sharing module 508 is configured to identify TXOPs in a shared medium, perform medium sensing, receive scheduling information for UL and/or DL communications, perform dynamic TDD, determine updates for UL scheduling information during link-priority switching, and/or monitor for updated DL scheduling information during link-priority switching, as described in greater detail herein.

As shown, the transceiver 510 may include the modem subsystem 512 and the RF unit 514. The transceiver 510 can be configured to communicate bi-directionally with other devices, such as the BSs 105 and 305. The modem subsystem 512 may be configured to modulate and/or encode the data from the memory 504 and/or the medium sharing module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 215 to enable the UE 215 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of RRS signals, updated control information, CSI-RSs, and/or SRSs according to embodiments of the present disclosure. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

Figure 6:
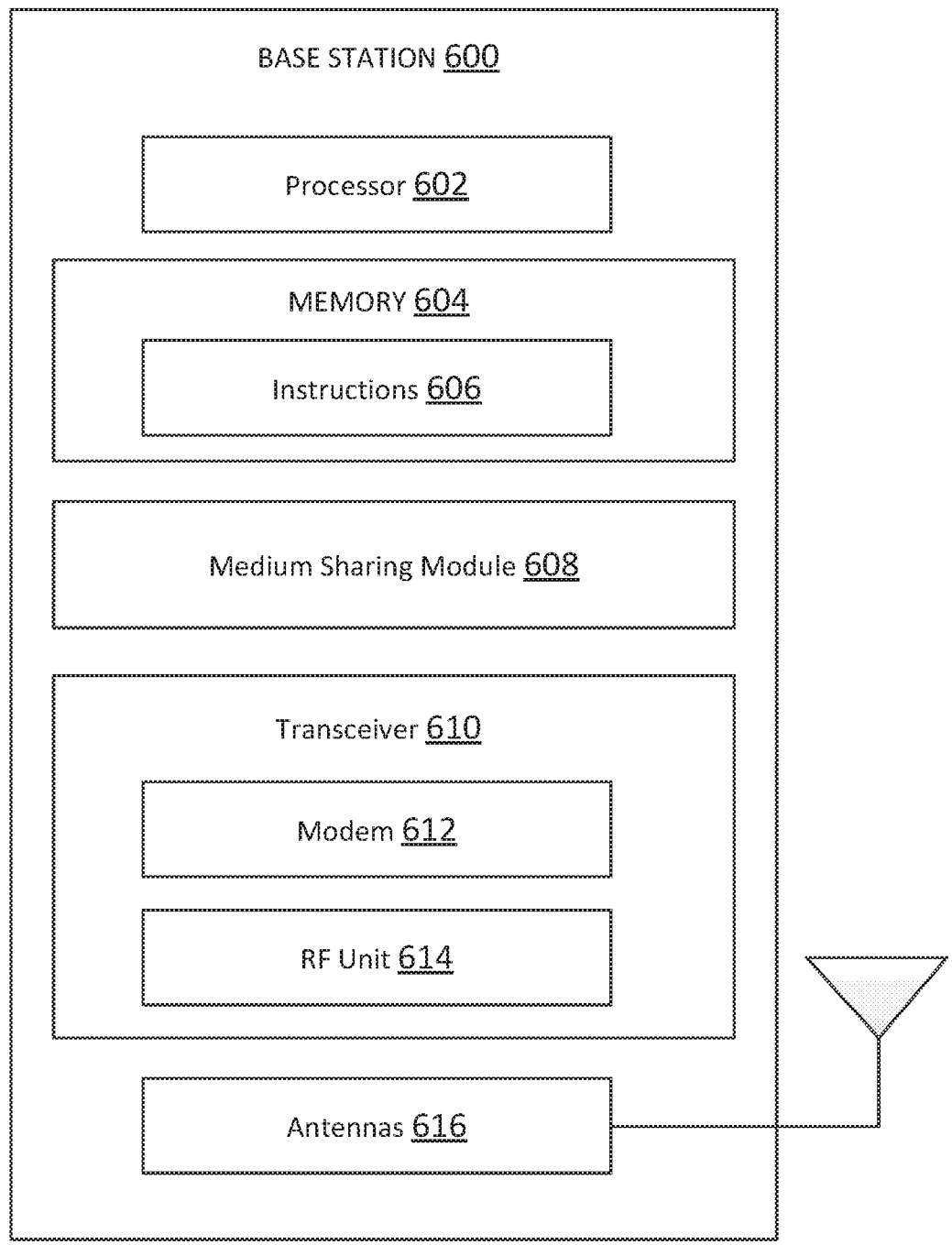
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 105 as discussed above. A shown, the BS 600 may include a processor 602, a memory 604, a medium sharing module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The medium sharing module 608 may be implemented via hardware, software, or combinations thereof. For example, the medium sharing module 608 may be implemented as a processor, circuit, and/or instructions 606 stored in the memory 604 and executed by the processor 602. The medium sharing module 608 may be used for various aspects of the present disclosure. For example, the medium sharing module 608 is configured to identify TXOPs in a shared spectrum, perform medium sensing, determine scheduling information for UL and/or DL communications, perform dynamic TDD, determine updates for DL scheduling information during link-priority switching, and/or monitor for updated UL scheduling information for link-priority switching, as described in greater detail herein.

As shown, the transceiver 610 may include the modem subsystem 612 and the RF unit 614. The transceiver 610 can be configured to communicate bi-directionally with other devices, such as the UEs 115 and 215 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

Figure 7:
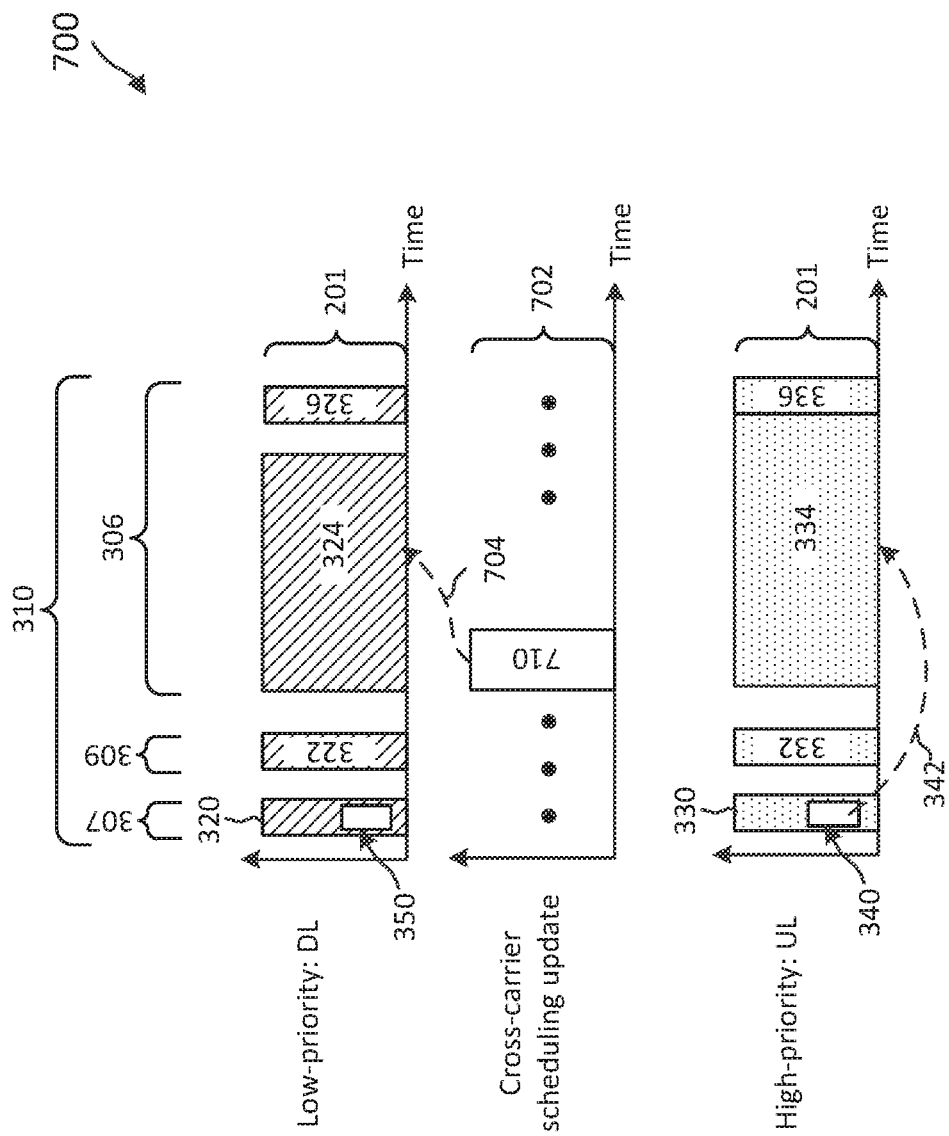
FIG. 7 illustrates a downlink (DL) control information update signaling scheme according to embodiments of the present disclosure.
Figure 8:
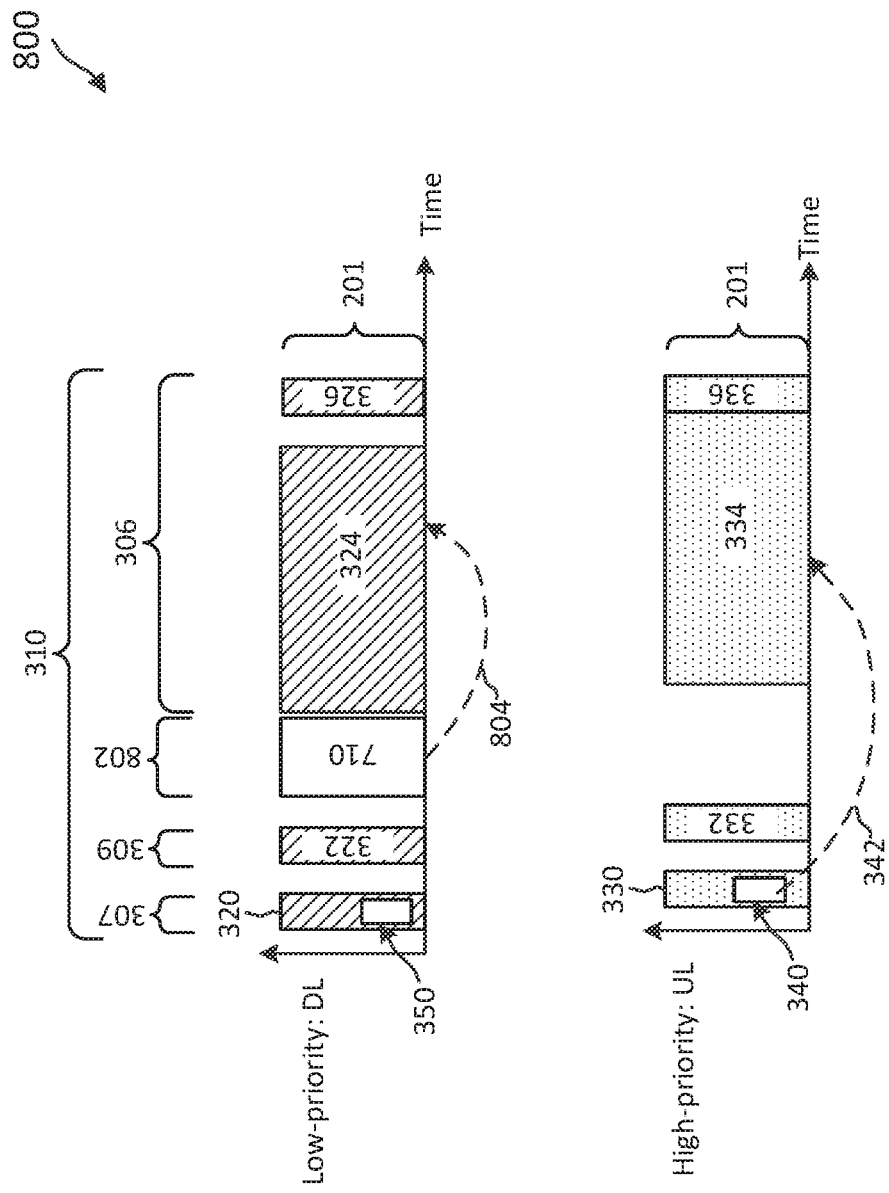
FIG. 8 illustrates a DL control information update signaling scheme according to embodiments of the present disclosure.
Figure 9:
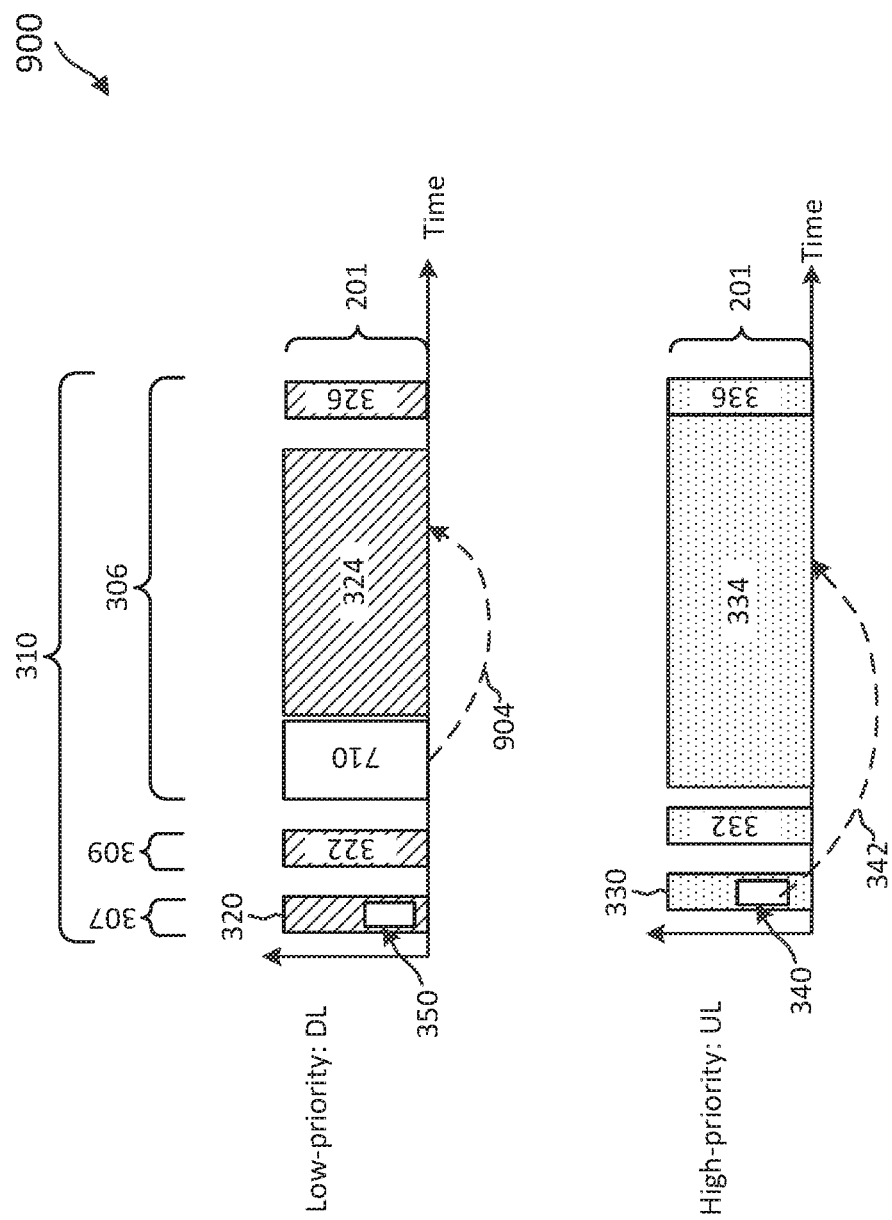
FIG. 9 illustrates a DL control information update signaling scheme according to embodiments of the present disclosure.

FIGS. 7-9 illustrate various mechanisms that may be employed by the low-priority DL-granting BS in the scenario 300 to signal updated DL scheduling information based on medium sensing, for example, upon detecting a reservation from the high-priority link (e.g., UL). In FIGS. 7-9, the x-axes represent time in some constant units and the y-axes represent frequency in some constant units.

FIG. 7 illustrates a DL control information update signaling scheme 700 according to embodiments of the present disclosure. In the scheme 700, a DL-granting BS of a low-priority link may transmit an RRQ signal 320 to schedule a UE for a DL communication in the sub-period 310. The RRQ signal 320 may include a DL transmission grant 350 for the scheduled UE. The DL transmission grant 350 may include scheduling information such as MCS, a transmit power, a transmission rank, pre-coding parameters, a sub-band allocation in the frequency band 201, and/or any other transmission-related parameters. The DL-granting BS (e.g., the target transmitter) may perform medium sensing in the frequency band 201 after transmitting the RRQ signal 320. For example, the DL-granting BS may perform medium sensing to determine whether the sub-period 310 is reserved by the high-priority link for a UL communication (e.g., the UL data 334 and the UL control 336).

After performing the medium sensing, the DL-granting BS generates an updated DL transmission grant 710 based on the initial DL transmission grant 350 and the medium sensing. For example, the DL-granting BS may detect an RRS signal 332 from the high-priority link. The DL-granting BS may determine an expected interference that the DL-granting BS may generate towards the high-priority UL communication, for example, based on the signal strength of the RRS signal 332. The DL-granting BS may modify one or more of the transmission parameters in the initial DL transmission grant 350 to minimize the potential interference from a DL transmission of the DL-granting BS to the high-priority UL communication.

In an embodiment, the DL-granting BS may detect an RRS signal 332 with relatively strong signal strength, indicating that a high-priority receiver may be located relatively close to the DL-granting BS. As such, the DL-granting BS may determine to reduce the transmit power for the DL communication so that the interference impact to the UL communication may be reduced. For example, the DL-granting BS may select a modulation order and/or a code rate that are lower than the modulation order and/or code rate in the initial DL transmission grant 350 so that the DL communication may be received and decoded correctly by the DL-scheduled UE at the reduced transmit power.

In an embodiment, the DL-granting BS may detect an RRS signal 332 from the high-priority link in a particular subband of the frequency band 201 that is initially scheduled for the DL communication. To reduce the interference impact on the UL communication, the DL-granting BS may select a different subband for the DL communication.

In an embodiment, the DL-granting BS may detect an RRS signal 332 from the high-priority link in a particular spatial layer that is initially scheduled for the DL communication. To reduce the interference impact on the UL communication, the DL-granting BS may modify the transmission rank and/or the pre-coding parameters of the DL communication.

To signal the scheduling update, the DL-granting BS applies cross-carrier scheduling to transmit the updated DL transmission grant 710 in a frequency band 702 different from the frequency band 201. For example, the frequency band 702 may be a licensed carrier of an operating entity of the DL-granting BS. Alternatively, the frequency band 702 may be a shared or unlicensed carrier that the DL-granting BS is allowed to access. The DL-granting BS may transmit the DL data 324 according to the updated DL transmission grant 710 as shown by the dashed arrow 704. In some instances, the frequency band 702 may be a primary component carrier and the frequency band 201 may be a secondary component carrier. For example, the DL-scheduled UE may have previously established a connection with the DL-scheduled UE in the frequency band 702. Thus, the DL-scheduled UE may receive the updated DL transmission grant 710 in the frequency band 702 and receive the DL data 324 in the frequency band 201 according to the updated DL transmission grant 710.

FIG. 8 illustrates a DL control information update signaling scheme 800 according to embodiments of the present disclosure. The scheme 800 is similar to the scheme 700. However, the scheme 800 includes a time period 802 designated for transmission of updated scheduling information. The time period 802 can be between the portion 309 and the portion 306. As shown, the DL-granting BS transmits the updated DL transmission grant 710 in the time period 802. In some embodiments, the updated DL transmission grant 710 may be transmitted using the same transmission configuration (e.g., modulation order, code rate, transmission power, aggregation level, and/or subband) as the initial DL transmission grant 350. Subsequently, the DL-granting BS transmits the DL data 324 according to the updated DL transmission grant 710 during the portion 306 as shown by the arrow 804. The addition of the designated time period 802 may delay the start of the portion 306, reducing resources that may be utilized by the high-priority link. While scheme 800 may be less efficient in spectrum utilization compared to the scheme 700, the scheme 800 may have less scheduling complexity.

FIG. 9 illustrates a DL control information update signaling scheme 900 according to embodiments of the present disclosure. The scheme 900 is similar to the schemes 700 and 800. However, the scheme 900 allows for updated scheduling information transmission along with data transmission. As shown, the DL-granting BS transmits the updated DL transmission grant 710 and the DL data 324 during the portion 306, where no additional time period is dedicated for the transmission of the updated DL transmission grant 710 as in the scheme 800. The updated DL transmission grant 710 and the DL data 324 are transmitted according to the medium sensing. Thus, the DL-scheduled UE may decode the updated DL transmission grant 710 followed by decoding the DL data 324 according to the updated scheduling information decoded from the updated DL transmission grant 710 as shown by the arrow 904.

As shown, the updated transmission grant 710 can be transmitted at the same time as the high-priority UL communication. Thus, the transmission of the updated DL transmission grant 710 may be impacted by interference from the UL communication. As such, in some instances the updated DL transmission grant 710 can still be decoded when the DL-granting BS uses a reduced transmit power or bandwidth due to the reservation of the high-priority link. In an embodiment, the frequency band 201 may be divided into a number of frequency subbands. The DL-granting BS may transmit the updated DL transmission grant 710 within a subband so that the updated scheduling information may be self-contained within the subband. Thus, the scheduling information can be self-decodable within the subband.

In some embodiments, the scheduling information in the initial DL transmission grant 350 may include a subband configuration. In such embodiments, the updated DL transmission grant 710 may be transmitted in one or more subband(s) according to the subband configuration and may indicate updated scheduling information associated with other subband(s).

In some embodiments, the updated DL transmission grant 710 may be transmitted over multiple subbands of the frequency band 201. For example, subband aggregation similar to the control channel element (CCE) aggregation in LTE PDCCH may be applied for the signaling of the updated DL transmission grant 710 to enable the DL-granting BS to further reduce transmit power. LTE supports aggregation levels 1, 2, 4, and 8, where 1, 2, 4, and 8 CCEs, respectively, may be used to carry a transmission grant. Thus, subband aggregation can be applied to transmit the updated DL transmission grant 710 over 1, 2, 4, or 8 subbands or any suitable number of subbands. However, the aggregation may increase the decoding complexity at the DL-scheduled UE. While the scheme 900 may be more efficient in spectrum utilization compared to the scheme 800 and may have less scheduling complexity compared to the scheme 700, the scheme 900 may have a higher implementation complexity at the DL-scheduled UE.

Figure 10:
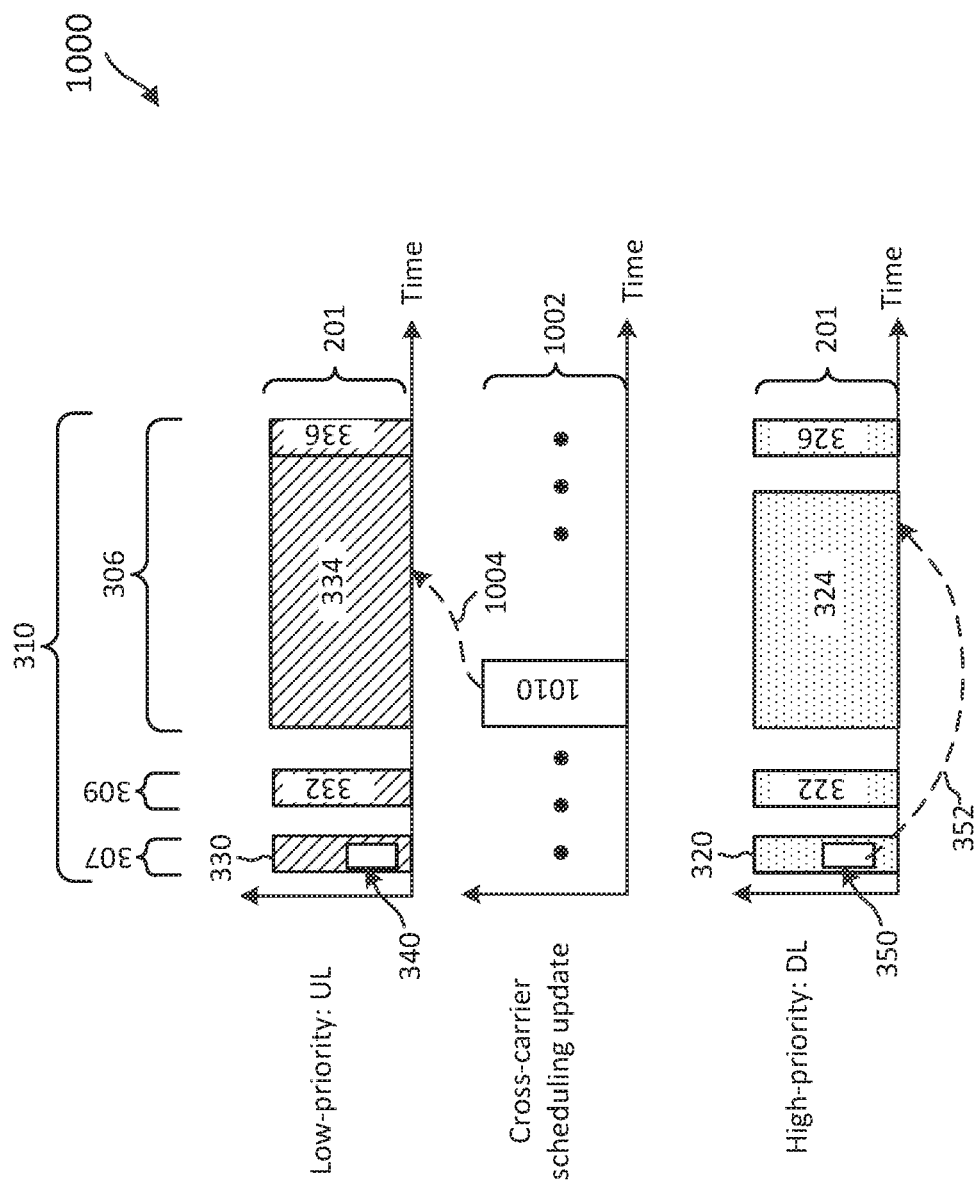
FIG. 10 illustrates an uplink (UL) control information update signaling scheme according to embodiments of the present disclosure.
Figure 11:
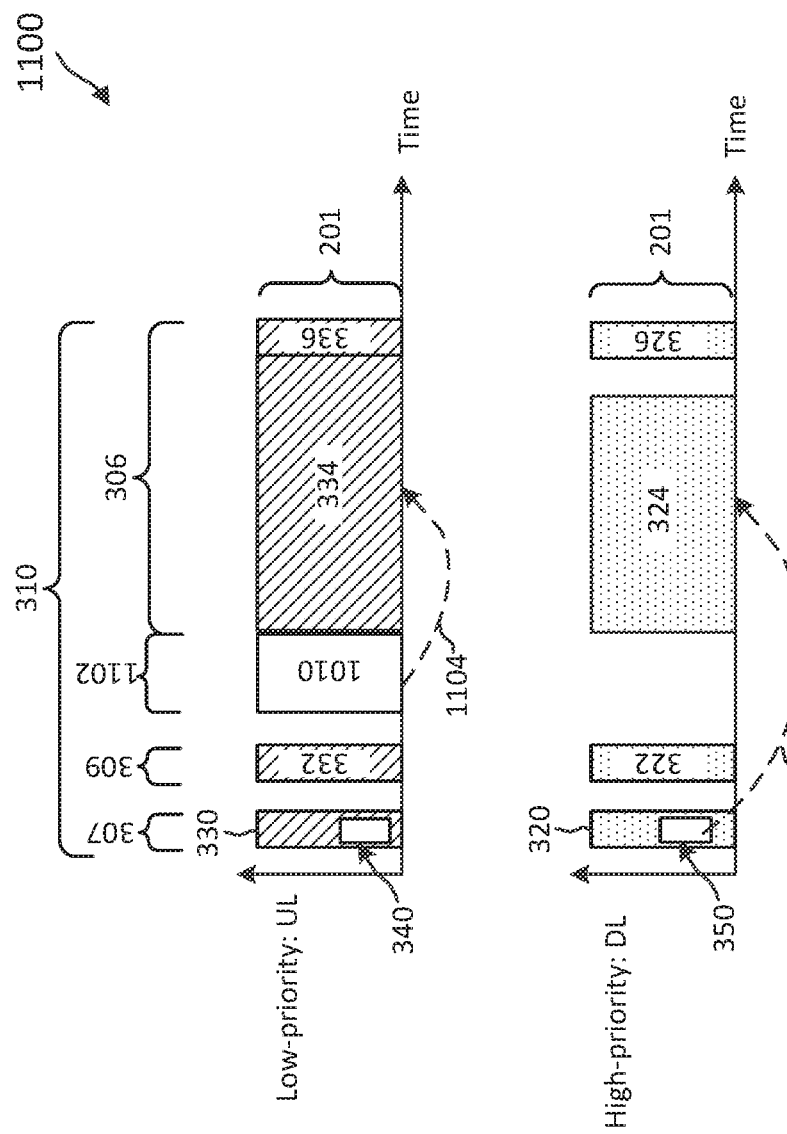
FIG. 11 illustrates a UL control information update signaling scheme according to embodiments of the present disclosure.
Figure 12:
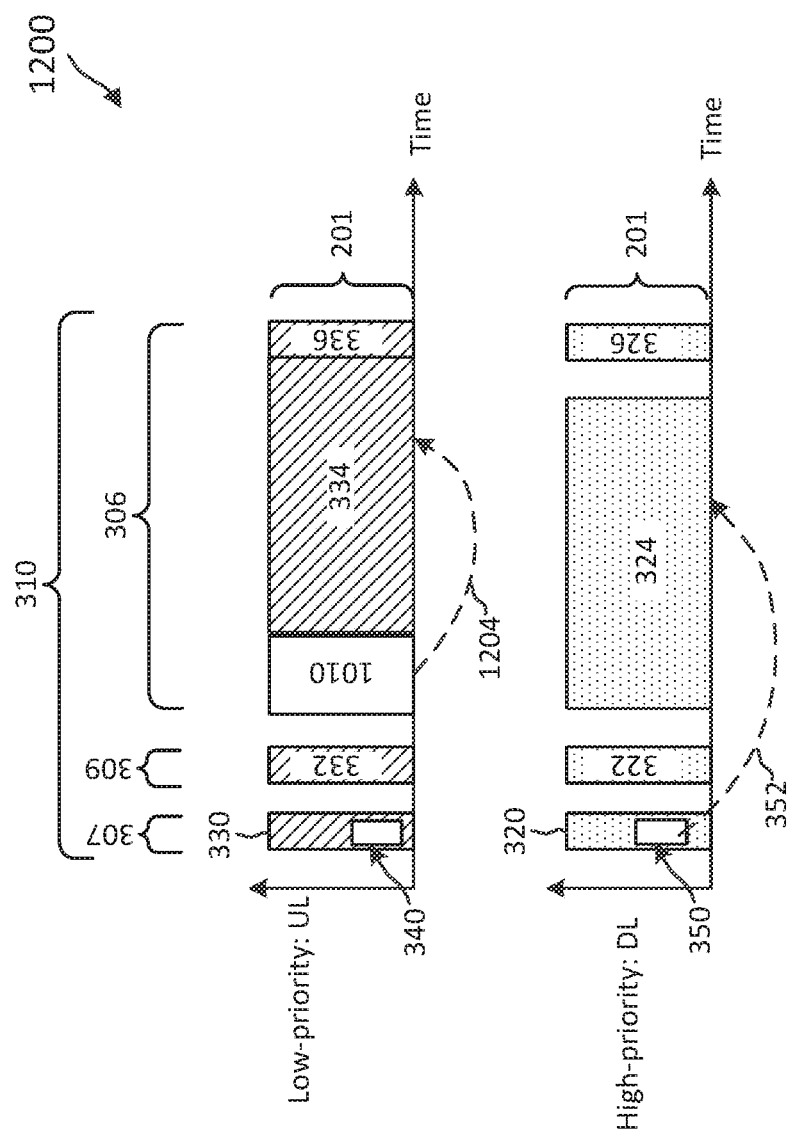
FIG. 12 illustrates a UL control information update signaling scheme according to embodiments of the present disclosure.

FIGS. 10-12 illustrate various mechanisms that may be employed by the low-priority UL-granting BS in the scenario 400 to signal updated UL scheduling information based on medium sensing, for example, upon detecting a reservation from the high-priority link (e.g., DL). In FIGS. 10-12, the x-axes represent time in some constant units and the y-axes represent frequency in some constant units.

FIG. 10 illustrates a UL control information update signaling scheme 1000 according to embodiments of the present disclosure. The scheme 1000 is substantially similar to the scheme 700, but illustrates signaling of UL scheduling update instead of DL scheduling update. In the scheme 1000, a UL-granting BS of a low-priority link may transmit an RRQ signal 330 to schedule a UE for a UL communication in the sub-period 310. The RRQ signal 330 may include a UL transmission grant 340 for the scheduled UE. The UL transmission grant 340 may include scheduling information such as a MCS, a transmit power, a transmission rank, pre-coding parameters, a subband allocation in the frequency band 201, and/or any other transmission-related parameters. The scheduled UE in the uplink may perform medium sensing to monitor for a reservation signal (e.g., the RRS signal 322) from the high-priority link (e.g., DL).

After performing the medium sensing, the UE scheduled by the UL-granting BS generates an updated UL transmission grant 1010 based on the initial UL grant 340 received from the UL-granting BS and the medium sensing. For example, the scheduled UE may determine an expected interference that the scheduled UE may generate towards the high-priority DL communication based on signal strengths of reservation signals detected from the medium sensing. The scheduled UE may modify one or more of the transmission parameters in the initial UL transmission grant 340 to minimize the potential interference from a UL transmission of the scheduled UE to the high-priority DL communication.

In an embodiment, the scheduled UE may detect an RRS signal 322 with relatively strong signal strength, indicating that a high-priority receiver may be located relatively close to the scheduled UE. As such, the scheduled UE may determine to reduce the transmit power for the UL communication. For example, the scheduled UE may select a modulation order and/or a code rate that are lower than the modulation order and/or code rate assigned by the UL-granting BS.

In an embodiment, the scheduled UE may detect an RRS signal 332 in a particular subband of the frequency band 201 that is included in the UL schedule of the UL transmission grant 340. To reduce the interference impact on the DL communication, the scheduled UE may select a different subband for the UL communication.

In an embodiment, the scheduled UE may detect an RRS signal 332 in a particular spatial layer that is included in the UL schedule of the UL transmission grant 340. To reduce the interference impact on the DL communication, the scheduled UE may modify the transmission rank and/or the pre-coding parameters of the UL communication.

To signal the scheduling update, the scheduled UE applies cross-carrier scheduling to transmit the updated UL transmission grant 1010 in a frequency band 1002 different from the frequency band 201. The scheduled UE may transmit the UL data 334 according to the updated UL transmission grant 1010 as shown by the dashed arrow 1004. In some instances, the frequency band 1002 may be a primary component carrier and the frequency band 201 may be a secondary component carrier. For example, the scheduled UE may have previously established a connection with the UL-granting BS in the frequency band 1002. Thus, the UL-granting BS may receive the updated UL transmission grant 1010 in the frequency band 1002 and receive the DL data 324 in the frequency band 201 according to the updated UL transmission grant 1010.

FIG. 11 illustrates a UL control information update signaling scheme 1100 according to embodiments of the present disclosure. The scheme 1100 is substantially similar to the scheme 800, but illustrates signaling of UL scheduling update instead of DL scheduling update. The scheme 1100 includes a time period 1102 (e.g., the time period 802) designated for transmission of updated scheduling information. As shown, the scheduled UE transmits the updated UL transmission grant 1010 in the designated time period 1102. In some embodiments, the updated UL transmission grant 1010 may be transmitted using the same transmission configuration (e.g., modulation order, code rate, transmission power, aggregation level, and/or subband) as the initial UL transmission grant 340. Subsequently, the scheduled UE transmits the UL data 334 according to the updated UL transmission grant 1010 during the portion 306 as shown by the arrow 1104. Similar to the scheme 800, the addition of the designated time period 1102 may delay the start of the portion 306.

FIG. 12 illustrates a UL control information update signaling scheme 1200 according to embodiments of the present disclosure. The scheme 1200 is substantially similar to the schemes 900, but illustrates signaling of UL scheduling update instead of DL scheduling update. The scheme 1200 allows for updated scheduling information transmission along with data transmission. As shown, the scheduled UE transmits the updated UL transmission grant 1010 and the UL data 334 during the portion 306. Thus, the UL-granting BS may decode the updated UL transmission grant 1010 followed by decoding the UL data 334 according to the updated scheduling information decoded from the UL transmission grant 1010 as shown by the arrow 1204. In addition, the scheduled UE may employ similar mechanisms as in the scheme 900 described with respect to FIG. 9 to transmit the updated UL transmission grant 1010 in a subband of the frequency band 201, repeating transmission of the updated UL transmission grant 1010 in multiple subbands, and/or indicating scheduling information associated with another subband of the frequency band 201.

Figure 13:
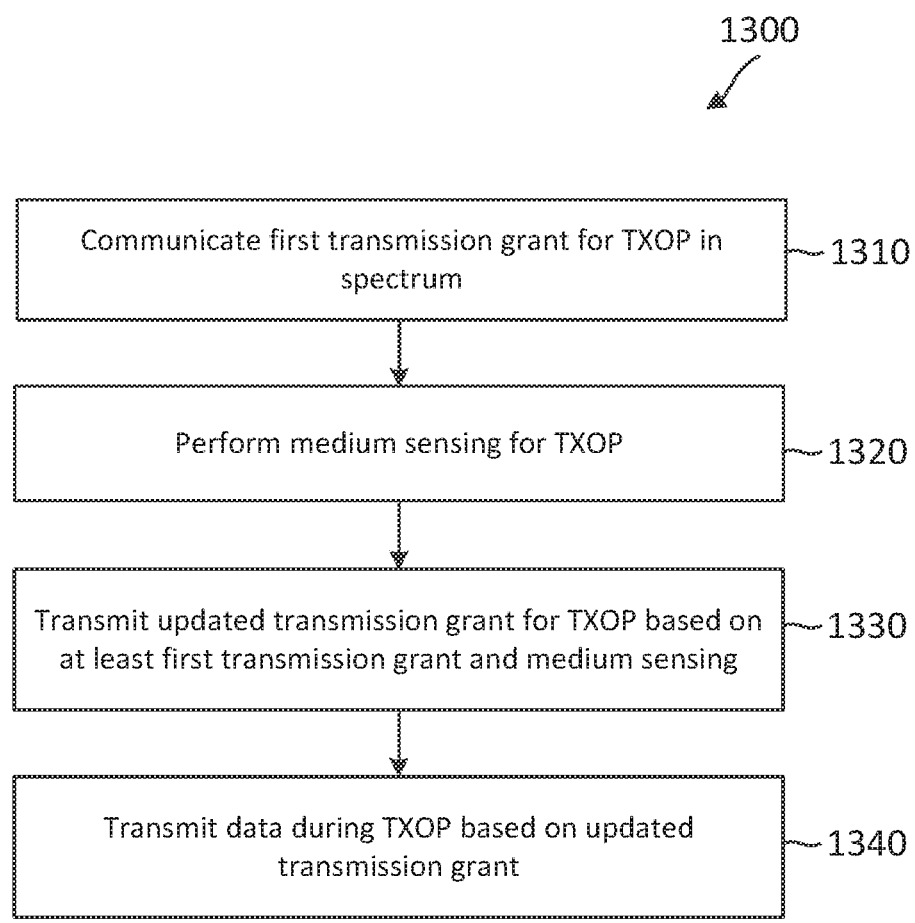
FIG. 13 is a flow diagram of a control information update method for dynamic TDD according to embodiments of the present disclosure.

FIG. 13 is a flow diagram of a control information update method 1300 according to embodiments of the present disclosure. Steps of the method 1300 can be executed by a computing device (e.g., a processor, processing circuit, and/or other suitable component) of a wireless communication device, such as the BSs 105 and 600 and the UEs 115 and 500. The method 1300 may employ similar mechanisms as in the schemes 200, 700, 800, 900, 1000, 1100, and 1200 described with respect to FIGS. 2, 7, 8, 9, 10, 11, and 12 respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes communicating a first transmission grant (e.g., the transmission grants 340 and 350) for a TXOP (e.g., the TXOPs 202 or the sub-periods 310) in a frequency band (e.g., the frequency band 201). The first transmission grant is for the wireless communication device to transmit in the TXOP. For example, the wireless communication device may represent a BS when the first transmission grant is a DL transmission grant and the BS may transmit the first transmission grant. Alternatively, the wireless communication device may represent a UE when the first transmission grant is a UL transmission grant and the UE may receive the first transmission grant.

At step 1320, the method 1300 includes performing medium sensing in the frequency band for the TXOP. The medium sensing may include monitoring for a reservation signal (e.g., the RRS signals 322 and 332) for the TXOP. The reservation signal may be for a communication in a first link direction and the first transmission grant may be for a communication in a second link direction. For example, the first link direction may be UL and the second link direction may be DL. Alternatively, the first link direction may be DL and the second link direction may be UL.

At step 1330, the method 1300 includes transmitting an updated transmission grant (e.g., the updated transmission grants 710 and 1010) based on at least the first transmission grant and the medium sensing. The updated transmission grant may include an updated transmission configuration such as a subband allocation in the frequency band, a (MCS, a transmission power, or a transmission rank that is different from the first transmission grant. The wireless communication device may determine the updated transmission configuration for interference management, for example, to reduce interference on the communication in the first link direction. The updated transmission grant may be transmitted in another frequency band (e.g., in the frequency bands 702 and 1002), in a designated time period (e.g., the time periods 802 and 1102) within the TXOP, or in a transmission period (e.g., the portion 306) within the TXOP along with data.

At step 1340, the method 1300 includes transmitting data (e.g., the DL data 324 and the UL data 334) in the TXOP based on the updated transmission grant.

Figure 14:
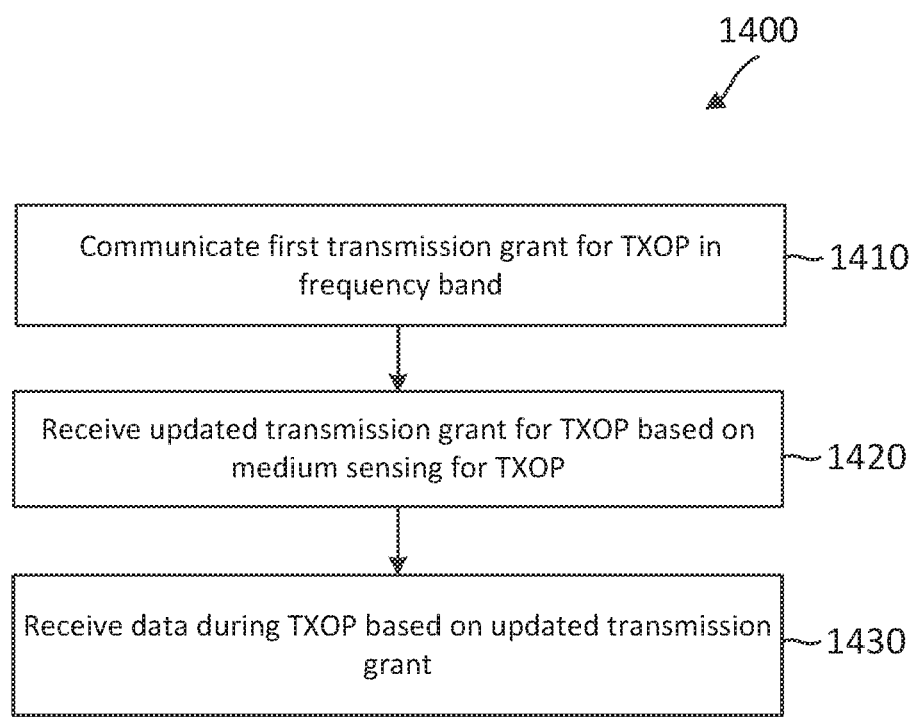
FIG. 14 is a flow diagram of a control information update method for dynamic TDD according to embodiments of the present disclosure.

FIG. 14 is a flow diagram of a control information update method 1400 according to embodiments of the present disclosure. Steps of the method 1400 can be executed by a computing device (e.g., a processor, processing circuit, and/or other suitable component) of a wireless communication device, such as the BSs 105 and 600 and the UEs 115 and 500. The method 1300 may employ similar mechanisms as in the schemes 200, 700, 800, 900, 1000, 1100, and 1200 described with respect to FIGS. 2, 7, 8, 9, 10, 11, and 12 respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating a first transmission grant (e.g., the transmission grants 340 and 350) for a TXOP (e.g., the TXOPs 202 or the sub-periods 310) in a frequency band (e.g., the frequency band 201). The first transmission grant is for the wireless communication device to receive in the TXOP. For example, the wireless communication device may represent a UE when the first transmission grant is a DL transmission grant. Alternatively, the wireless communication device may represent a BS when the first transmission grant is a UL transmission grant.

At step 1420, the method 1400 includes receiving an updated transmission grant (e.g., the updated transmission grants 710 and 1010) based on medium sensing for the TXOP. The updated transmission grant may include an updated transmission configuration such as a subband allocation in the frequency band, a modulation coding scheme (MCS), a transmission power, or a transmission rank that is different from the first transmission grant. The updated transmission grant may be received in another frequency band (e.g., in the frequency bands 702 and 1002), in a designated time period (e.g., the time period 802 and 1102) within the TXOP, or in a transmission period (e.g., the portion 306) along with data.

At step 1430, the method 1400 includes receiving data (e.g., the DL data 324 and the UL data 334) during the TXOP based on the updated transmission grant.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the disclosure include a method of wireless communication, comprising communicating, by a first wireless communication device with a second wireless communication device, a first transmission grant for a transmission opportunity (TXOP) in a frequency band; performing, by the first wireless communication device, medium sensing for the TXOP; and transmitting, by the first wireless communication device to the second wireless communication device, an updated transmission grant for the TXOP based on at least the first transmission grant and the medium sensing.

The method further includes wherein the performing the medium sensing includes detecting a reservation signal for the TXOP. The method further includes wherein the performing the medium sensing includes detecting a reservation signal for communicating in a first link direction during the TXOP, wherein the first transmission grant and the updated transmission grant are for communicating in a second link direction, and wherein the first link direction and the second link direction are different. The method further includes transmitting, by the first wireless communication device to the second wireless communication device in the frequency band, data during the TXOP based on the updated transmission grant. The method further includes wherein the communicating includes transmitting, by the first wireless communication device to the second wireless communication device, the first transmission grant. The method further includes wherein the communicating includes receiving, by the first wireless communication device from the second wireless communication device, the first transmission grant. The method further includes wherein the first wireless communication device is a user equipment. The method further includes generating, by the first wireless communication device, the updated transmission grant by modifying scheduling information in the first transmission grant based on at least the medium sensing. The method further includes wherein the updated transmission grant includes at least one of a subband allocation in the frequency band, a modulation coding scheme (MCS), a transmission power, or a transmission rank that is different from the first transmission grant. The method further includes wherein the transmitting the updated transmission grant includes transmitting the updated transmission grant in another frequency band. The method further includes wherein the TXOP includes a designated time period for an updated transmission grant transmission, and wherein the transmitting the updated transmission grant includes transmitting the updated transmission grant in the frequency band during the designated time period. The method further includes wherein the medium sensing is for a transmission period of the TXOP, and wherein the transmitting the updated transmission grant includes transmitting the updated transmission grant in the frequency band during the transmission period. The method further includes wherein the transmitting the updated transmission grant includes transmitting the updated transmission grant in a first subband of the frequency band, wherein the updated transmission grant indicates updated scheduling information associated with a second subband of the frequency band, and wherein the first subband and the second subband are different.

Further embodiments of the disclosure include a method of wireless communication, comprising communicating, by a first wireless communication device with a second wireless communication device, a first transmission grant for a transmission opportunity (TXOP) in a frequency band; and receiving, by the first wireless communication device from the second wireless communication device, an updated transmission grant for the TXOP based on a medium sensing for the TXOP.

The method further includes receiving, by the first wireless communication device from the second wireless communication device, data in the frequency band during the TXOP based on the updated transmission grant. The method further includes wherein the communicating includes transmitting, by the first wireless communication device to the second wireless communication device, the first transmission grant. The method further includes wherein the communicating includes receiving, by the first wireless communication device from the second wireless communication device, the first transmission grant. The method further includes wherein the updated transmission grant includes at least one of a subband allocation in the frequency band, a modulation coding scheme (MCS), a transmission power, or a transmission rank that is different from the first transmission grant. The method further includes wherein the receiving the updated transmission grant includes receiving the updated transmission grant in another frequency band. The method further includes wherein the TXOP includes a designated time period for an updated transmission grant transmission, and wherein the receiving the updated transmission grant includes receiving the updated transmission grant in the frequency band during the designated time period. The method further includes wherein the medium sensing is for a transmission period of the TXOP, and wherein the receiving the updated transmission grant includes receiving the updated transmission grant in the frequency band during the transmission period. The method further includes wherein the receiving the updated transmission grant includes receiving the updated transmission grant in a first subband of the frequency band, wherein the updated transmission grant indicates updated scheduling information associated with a second subband of the frequency band, and wherein the first subband and the second subband are different.

Further embodiments of the disclosure include an apparatus comprising a transceiver configured to communicate with a second wireless communication device, a first transmission grant for a transmission opportunity (TXOP) in a frequency band; and transmit, to the second wireless communication device, an updated transmission grant for the TXOP based on at least the first transmission grant and a medium sensing; and a processor configured to perform the medium sensing for the TXOP.

The apparatus further includes wherein the processor is further configured to perform the medium sensing by detecting a reservation signal for the TXOP. The apparatus further includes wherein the processor is further configured to perform the medium sensing by detecting a reservation signal for communicating in a first link direction during the TXOP, wherein the first transmission grant and the updated transmission grant are for communicating in a second link direction, and wherein the first link direction and the second link direction are different. The apparatus further includes wherein the transceiver is further configured to transmit, to the second wireless communication device in the frequency band, data during the TXOP based on the updated transmission grant. The apparatus further includes wherein the transceiver is further configured to communicate the first transmission grant by transmitting, to the second wireless communication device, the first transmission grant. The apparatus further includes wherein the transceiver is further configured to communicate the first transmission grant by receiving, from the second wireless communication device, the first transmission grant. The apparatus further includes wherein the apparatus is a user equipment. The apparatus further includes wherein the processor is further configured to generate the updated transmission grant by modifying scheduling information in the first transmission grant based on at least the medium sensing. The apparatus further includes wherein the updated transmission grant includes at least one of a subband allocation in the frequency band, a modulation coding scheme (MCS), a transmission power, or a transmission rank that is different from the first transmission grant. The apparatus further includes wherein the transceiver is further configured to transmit the updated transmission grant in another frequency band. The apparatus further includes wherein the TXOP includes a designated time period for an updated transmission grant transmission, and wherein the transceiver is further configured to transmit the updated transmission grant in the frequency band during the designated time period. The apparatus further includes wherein the medium sensing is for a transmission period of the TXOP, and wherein the transceiver is further configured to transmit the updated transmission grant in the frequency band during the transmission period. The apparatus further includes wherein the transceiver is further configured to transmit the updated transmission grant in a first subband of the frequency band, wherein the updated transmission grant indicates updated scheduling information associated with a second subband of the frequency band, and wherein the first subband and the second subband are different.

Further embodiments of the disclosure include an apparatus comprising a transceiver configured to communicate with a second wireless communication device, a first transmission grant for a transmission opportunity (TXOP) in a frequency band; and receive, from the second wireless communication device, an updated transmission grant for the TXOP based on a medium sensing for the TXOP.

The apparatus further includes wherein the transceiver is further configured to receive, from the second wireless communication device, data in the frequency band during the TXOP based on the updated transmission grant. The apparatus further includes wherein the transceiver is further configured to communicate the first transmission grant by transmitting, to the second wireless communication device, the first transmission grant. The apparatus further includes wherein the transceiver is further configured to communicate the first transmission grant by receiving, from the second wireless communication device, the first transmission grant. The apparatus further includes wherein the updated transmission grant includes at least one of a subband allocation in the frequency band, a modulation coding scheme (MCS), a transmission power, or a transmission rank that is different from the first transmission grant. The apparatus further includes wherein the transceiver is further configured to receive the updated transmission grant in another frequency band. The apparatus further includes wherein the TXOP includes a designated time period for an updated transmission grant transmission, and wherein the transceiver is further configured to receive the updated transmission grant in the frequency band during the designated time period. The apparatus further includes wherein the medium sensing is for a transmission period of the TXOP, and wherein the transceiver is further configured to receive the updated transmission grant in the frequency band during the transmission period. The apparatus further includes wherein the transceiver is further configured to receive the updated transmission grant in a first subband of the frequency band, wherein the updated transmission grant indicates updated scheduling information associated with a second subband of the frequency band, and wherein the first subband and the second subband are different.

Further embodiments of the disclosure include a computer-readable medium having program code recorded thereon, the program code comprising code for causing a first wireless communication device to communicate with a second wireless communication device, a first transmission grant for a transmission opportunity (TXOP) in a frequency band; code for causing the first wireless communication device to perform medium sensing for the TXOP; and code for causing the first wireless communication device to transmit, to the second wireless communication device, an updated transmission grant for the TXOP based on at least the first transmission grant and the medium sensing.

The computer-readable medium further includes wherein the code for causing the first wireless communication device to perform the medium sensing is further configured to detect a reservation signal for the TXOP. The computer-readable medium further includes wherein the code for causing the first wireless communication device to performing the medium sensing is further configured to detect a reservation signal for communicating in a first link direction during the TXOP, wherein the first transmission grant and the updated transmission grant are for communicating in a second link direction, and wherein the first link direction and the second link direction are different. The computer-readable medium further includes code for causing the first wireless communication device to transmit, to the second wireless communication device in the frequency band, data during the TXOP based on the updated transmission grant.

The computer-readable medium further includes wherein the code for causing the first wireless communication device to communicating first transmission grant is further configured to transmit, to the second wireless communication device, the first transmission grant. The computer-readable medium further includes wherein the code for causing the first wireless communication device to communicate the first transmission grant is further configured to receive, from the second wireless communication device, the first transmission grant. The computer-readable medium further includes wherein the first wireless communication device is a user equipment. The computer-readable medium further includes code for causing the first wireless communication device to generate the updated transmission grant by modifying scheduling information in the first transmission grant based on at least the medium sensing. The computer-readable medium further includes wherein the updated transmission grant includes at least one of a subband allocation in the frequency band, a modulation coding scheme (MCS), a transmission power, or a transmission rank that is different from the first transmission grant. The computer-readable medium further includes wherein the code for causing the first wireless communication device to transmit the updated transmission grant is further configured to transmit the updated transmission grant in another frequency band. The computer-readable medium further includes wherein the TXOP includes a designated time period for an updated transmission grant transmission, and wherein the code for causing the first wireless communication device to transmitting the updated transmission grant is further configured to transmit the updated transmission grant in the frequency band during the designated time period. The computer-readable medium further includes wherein the medium sensing is for a transmission period of the TXOP, and wherein the code for causing the first wireless communication device to transmit the updated transmission grant is further configured to transmit the updated transmission grant in the frequency band during the transmission period. The computer-readable medium further includes wherein the code for causing the first wireless communication device to transmit the updated transmission grant is further configured to transmit the updated transmission grant in a first subband of the frequency band, wherein the updated transmission grant indicates updated scheduling information associated with a second subband of the frequency band, and wherein the first subband and the second subband are different.

Further embodiments of the disclosure include a computer-readable medium having program code recorded thereon, the program code comprising code for causing a first wireless communication device to communicate with a second wireless communication device, a first transmission grant for a transmission opportunity (TXOP) in a frequency band; and code for causing the first wireless communication device to receive, from the second wireless communication device, an updated transmission grant for the TXOP based on a medium sensing for the TXOP.

The computer-readable medium further includes code for causing the first wireless communication device to receive, from the second wireless communication device, data in the frequency band during the TXOP based on the updated transmission grant. The computer-readable medium further includes wherein the code for causing the first wireless communication device to communicate the first transmission grant is further configured to transmit, to the second wireless communication device, the first transmission grant. The computer-readable medium further includes wherein the code for causing the first wireless communication device to communicate the first transmission grant is further configured to receive, from the second wireless communication device, the first transmission grant. The computer-readable medium further includes wherein the updated transmission grant includes at least one of a subband allocation in the frequency band, a modulation coding scheme (MCS), a transmission power, or a transmission rank that is different from the first transmission grant. The computer-readable medium further includes wherein the code for causing the first wireless communication device to receive the updated transmission grant is further configured to receive the updated transmission grant in another frequency band. The computer-readable medium further includes wherein the TXOP includes a designated time period for an updated transmission grant transmission, and wherein the code for causing the first wireless communication device to receive the updated transmission grant is further configured to receive the updated transmission grant in the frequency band during the designated time period. The computer-readable medium further includes wherein the medium sensing is for a transmission period of the TXOP, and wherein the code for causing the first wireless communication device to receive the updated transmission grant is further configured to receive the updated transmission grant in the frequency band during the transmission period. The computer-readable medium further includes wherein the code for causing the first wireless communication device to receive the updated transmission grant is further configured to receive the updated transmission grant in a first subband of the frequency band, wherein the updated transmission grant indicates updated scheduling information associated with a second subband of the frequency band, and wherein the first subband and the second subband are different.

Further embodiments of the disclosure include an apparatus comprising means for communicating with a second wireless communication device, a first transmission grant for a transmission opportunity (TXOP) in a frequency band; means for performing medium sensing for the TXOP; and means for transmitting, to the second wireless communication device, an updated transmission grant for the TXOP based on at least the first transmission grant and a medium sensing.

The apparatus further includes wherein the means for performing the medium sensing is further configured to detect a reservation signal for the TXOP. The apparatus further includes wherein the means for performing the medium sensing is further configured to detect a reservation signal for communicating in a first link direction during the TXOP, wherein the first transmission grant and the updated transmission grant are for communicating in a second link direction, and wherein the first link direction and the second link direction are different. The apparatus further includes means for transmitting, to the second wireless communication device in the frequency band, data during the TXOP based on the updated transmission grant. The apparatus further includes wherein the means for communicating the first transmission grant is further configured to transmit, to the second wireless communication device, the first transmission grant. The apparatus further includes wherein the means for communicating the first transmission grant is further configured to receive, from the second wireless communication device, the first transmission grant. The apparatus further includes wherein the apparatus is a user equipment. The apparatus further includes means for generating the updated transmission grant by modifying scheduling information in the first transmission grant based on at least the medium sensing. The apparatus further includes wherein the updated transmission grant includes at least one of a subband allocation in the frequency band, a modulation coding scheme (MCS), a transmission power, or a transmission rank that is different from the first transmission grant. The apparatus further includes wherein the means for transmitting the updated transmission grant is further configured to transmit the updated transmission grant in another frequency band. The apparatus further includes wherein the TXOP includes a designated time period for an updated transmission grant transmission, and wherein the means for transmitting the updated transmission grant is further configured to transmit the updated transmission grant in the frequency band during the designated time period. The apparatus further includes wherein the medium sensing is for a transmission period of the TXOP, and wherein the means for transmitting the updated transmission grant is further configured to transmit the updated transmission grant in the frequency band during the transmission period. The apparatus further includes wherein the means for transmitting the updated transmission grant is further configured to transmit the updated transmission grant in a first subband of the frequency band, wherein the updated transmission grant indicates updated scheduling information associated with a second subband of the frequency band, and wherein the first subband and the second subband are different.

Further embodiments of the disclosure include an apparatus comprising means for communicating with a second wireless communication device, a first transmission grant for a transmission opportunity (TXOP) in a frequency band; and means for receiving, from the second wireless communication device, an updated transmission grant for the TXOP based on a medium sensing for the TXOP.

The apparatus further includes means for receiving, from the second wireless communication device, data in the frequency band during the TXOP based on the updated transmission grant. The apparatus further includes wherein the means for communicating the first transmission grant is further configured to transmit, to the second wireless communication device, the first transmission grant. The apparatus further includes wherein the means for communicating the first transmission grant is further configured to receive, from the second wireless communication device, the first transmission grant. The apparatus further includes wherein the updated transmission grant includes at least one of a subband allocation in the frequency band, a modulation coding scheme (MCS), a transmission power, or a transmission rank that is different from the first transmission grant. The apparatus further includes wherein the means for receiving the updated transmission grant is further configured to receive the updated transmission grant in another frequency band. The apparatus further includes wherein the TXOP includes a designated time period for an updated transmission grant transmission, and wherein the means for receiving the updated transmission grant is further configured to receive the updated transmission grant in the frequency band during the designated time period. The apparatus further includes wherein the medium sensing is for a transmission period of the TXOP, and wherein the means for receiving the updated transmission grant is further configured to receive the updated transmission grant in the frequency band during the transmission period. The apparatus further includes wherein the means for receiving the updated transmission grant is further configured to receive the updated transmission grant in a first subband of the frequency band, wherein the updated transmission grant indicates updated scheduling information associated with a second subband of the frequency band, and wherein the first subband and the second subband are different.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a user equipment (UE) from a base station (BS) in a frequency band and in a first link direction, a first transmission grant for a transmission opportunity (TXOP) in the frequency band, the first transmission grant indicating a subband configuration that includes at least a first subband within the frequency band;
   performing, by the UE in the frequency band, medium sensing for the TXOP, wherein the performing the medium sensing includes detecting, in the first subband, a reservation signal for the TXOP; and
   communicating, by the UE with the BS, an updated transmission grant for the TXOP based on at least the first transmission grant, a priority associated with the first link direction, and the medium sensing, the updated transmission grant communicated using a smaller bandwidth in the frequency band than the first transmission grant and according to the subband configuration indicated by the first transmission grant, wherein the updated transmission grant indicates updated scheduling information associated with a second subband within the frequency band, and wherein the second subband is different from the first subband based on the reservation signal for the TXOP being detected in the first subband from the medium sensing.

2. The method of claim 1, wherein the detecting the reservation signal comprises:
   detecting, by the UE, the reservation signal for communicating in a second link direction during the TXOP, wherein the first transmission grant and the updated transmission grant are for communicating in a third link direction, and wherein the third link direction and the second link direction are different.

3. The method of claim 1, wherein the communicating the updated transmission grant includes transmitting, by the UE to the BS, the updated transmission grant, and wherein the method further comprises transmitting, by the UE to the BS in the frequency band, data during the TXOP based on the updated transmission grant.

4. The method of claim 1, further comprising generating, by the UE, the updated transmission grant by modifying scheduling information in the first transmission grant based on at least the medium sensing.

5. The method of claim 1, wherein the updated transmission grant includes at least one of a subband allocation in the frequency band, a modulation coding scheme (MCS), a transmission power, or a transmission rank that is different from the first transmission grant, the subband allocation including at least the second subband.

6. The method of claim 1, wherein the communicating the updated transmission grant includes communicating the updated transmission grant in the frequency band during at least one of a designated time period within the TXOP for an updated transmission grant transmission or a transmission period within the TXOP associated with the medium sensing.

7. The method of claim 1, wherein the communicating the updated transmission grant includes communicating the updated transmission grant in the first subband.

8. A method of wireless communication, comprising:
   transmitting, by base station (BS) to a user equipment (UE) in a frequency band and in a first link direction, a first transmission grant for a transmission opportunity (TXOP) in the frequency band, the first transmission grant indicating a subband configuration that includes at least a first subband within the frequency band;
   performing, by the BS in the frequency band, medium sensing for the TXOP, wherein the performing the medium sensing includes detecting, in the first subband, a reservation signal for the TXOP; and
   communicating, by the BS with the UE, an updated transmission grant for the TXOP based on the medium sensing for the TXOP and a priority associated with the first link direction, the updated transmission grant communicated using a smaller bandwidth in the frequency band than the first transmission grant and according to the subband configuration indicated by the first transmission grant, wherein the updated transmission grant indicates updated scheduling information associated with a second subband within the frequency band, and wherein the second subband is different from the first subband based on the reservation signal for the TXOP being detected in the first subband from the medium sensing.

9. The method of claim 8, wherein the communicating the updated transmission grant includes communicating the updated transmission grant in the frequency band during at least one of a designated time period within the TXOP for an updated transmission grant transmission or a transmission period within the TXOP associated with the medium sensing.

10. The method of claim 8, wherein the communicating the updated transmission grant includes communicating the updated transmission grant in the first subband.

11. A user equipment (UE) comprising:
    a transceiver configured to:
    receive, from a base station (BS) in a frequency band and in a first link direction, a first transmission grant for a transmission opportunity (TXOP) in the frequency band, the first transmission grant indicating a subband configuration that includes at least a first subband within the frequency band; and
    a processor configured to perform medium sensing for the TXOP, wherein the processor configured to perform the medium sensing is configured to detect, in the first subband, a reservation signal for the TXOP; and
    wherein the transceiver is further configured to:
    communicate, with the BS, an updated transmission grant for the TXOP based on at least the first transmission grant, a priority associated with the first link direction, and the medium sensing, the updated transmission grant communicated using a smaller bandwidth in the frequency band than the first transmission grant and according to the subband configuration indicated by the first transmission grant, wherein the updated transmission grant indicates updated scheduling information associated with a second subband within the frequency band, and wherein the second subband is different from the first subband based on the reservation signal for the TXOP being detected in the first subband from the medium sensing.

12. The UE of claim 11, wherein the processor configured to perform the medium sensing is further configured to detect the reservation signal for communicating in a second link direction during the TXOP, wherein the first transmission grant and the updated transmission grant are for communicating in a third link direction, and wherein the third link direction and the second link direction are different.

13. The UE of claim 11, wherein the transceiver configured to communicate the updated transmission grant is further configured to transmit the updated transmission grant to the BS, and wherein the transceiver is further configured to transmit, to the BS in the frequency band, data during the TXOP based on the updated transmission grant.

14. The UE of claim 11, wherein the processor is further configured to generate the updated transmission grant by modifying scheduling information in the first transmission grant based on at least the medium sensing.

15. The UE of claim 11, wherein the updated transmission grant includes at least one of a subband allocation in the frequency band, a modulation coding scheme (MCS), a transmission power, or a transmission rank that is different from the first transmission grant, the subband allocation including at least the second subband.

16. The UE of claim 11, wherein the transceiver is further configured to communicate the updated transmission grant in the frequency band during at least one of a designated time period within the TXOP for an updated transmission grant transmission or a transmission period within the TXOP associated with the medium sensing.

17. The UE of claim 11, wherein the transceiver is further configured to communicate the updated transmission grant in the first subband.

18. A base station (BS) comprising:
a transceiver configured to:
transmit, to a user equipment (UE) in a frequency band and in a first link direction, a first transmission grant for a transmission opportunity (TXOP) in the frequency band, the first transmission grant indicating a subband configuration that includes at least a first subband within the frequency band; and
a processor configured to perform medium sensing for the TXOP, wherein the processor configured to perform the medium sensing is configured to detect, in the first subband, a reservation signal for the TXOP; and
wherein the transceiver is further configured to:
communicate, with the UE, an updated transmission grant for the TXOP based on a priority associated with the first link direction and the medium sensing for the TXOP, the updated transmission grant communicated using a smaller bandwidth in the frequency band than the first transmission grant and according to the subband configuration indicated by the first transmission grant, wherein the updated transmission grant indicates updated scheduling information associated with a second subband within the frequency band, and wherein the second subband is different from the first subband based on the reservation signal for the TXOP being detected in the first subband from the medium sensing.

19. The BS of claim 18, wherein the transceiver is further configured to communicate the updated transmission grant in the frequency band during at least one of a designated time period within the TXOP for an updated transmission grant transmission or a transmission period within the TXOP associated with the medium sensing.

20. The BS of claim 18, wherein the transceiver is further configured to communicate the updated transmission grant in the first subband.

21. The method of claim 8, wherein the communicating the updated transmission grant includes transmitting, by the BS to the UE, the updated transmission grant, and wherein the method further comprises transmitting, by the BS to the UE, data in the frequency band during the TXOP based on the updated transmission grant.

22. The method of claim 8, further comprising:
generating, by the BS, the updated transmission grant by modifying scheduling information in the first transmission grant based on at least the detection of the reservation signal for the TXOP from the medium sensing.

23. The BS of claim 18, wherein the transceiver configured to communicate the updated transmission grant is further configured to transmit the updated transmission grant to the UE, and wherein the transceiver is further configured to transmit, to the UE, data in the frequency band during the TXOP based on the updated transmission grant.

24. The BS of claim 18, wherein the processor is further configured to:
generate the updated transmission grant by modifying scheduling information in the first transmission grant based on at least the detection of the reservation signal for the TXOP from the medium sensing.

25. The method of claim 4, wherein the modifying the scheduling information in the first transmission grant includes:
selecting, by the UE, the second subband based on the second subband being different than the first subband where the reservation signal for the TXOP is detected.

26. The method of claim 22, wherein the modifying the scheduling information in the first transmission grant includes:
selecting, by the BS, the second subband based on the second subband being different than the first subband where the reservation signal for the TXOP is detected.

* * * * *